United States Patent
Lambie et al.

(10) Patent No.: US 10,371,860 B2
(45) Date of Patent: Aug. 6, 2019

(54) SIMULTANEOUS MULTI-EVENT UNIVERSAL KRIGING METHODS FOR SPATIO-TEMPORAL DATA ANALYSIS AND MAPPING

(71) Applicant: S.S. Papadopulos & Associates, Inc., Bethesda, MD (US)

(72) Inventors: John M. Lambie, Portland, OR (US); Jack Dahl, Portland, OR (US); Jonathan Kennel, Toronto (CA); Matthew Tonkin, Bethesda, MD (US); Marinko Karanovic, Bethesda, MD (US); William A. Huber, Rosemont, PA (US)

(73) Assignee: S.S. Papadopulos & Associates, Inc., Bethesda, MD (US)

( * ) Notice: Subject to any disclaimer, the term of this patent is extended or adjusted under 35 U.S.C. 154(b) by 680 days.

(21) Appl. No.: 14/285,543

(22) Filed: May 22, 2014

(65) Prior Publication Data

US 2014/0350856 A1 Nov. 27, 2014

Related U.S. Application Data

(60) Provisional application No. 61/826,179, filed on May 22, 2013.

(51) Int. Cl.
*G01W 1/00* (2006.01)
*G01W 1/02* (2006.01)
*G01W 1/10* (2006.01)

(52) U.S. Cl.
CPC ............... *G01W 1/00* (2013.01); *G01W 1/02* (2013.01); *G01W 1/10* (2013.01)

(58) Field of Classification Search
CPC . G01W 1/00; G01W 1/02; G01W 1/10; E21B 49/00
See application file for complete search history.

(56) References Cited

U.S. PATENT DOCUMENTS

| | | | | |
|---|---|---|---|---|
| 6,021,664 A | * | 2/2000 | Granato | E21B 49/084 166/264 |
| 7,082,382 B1 | * | 7/2006 | Rose, Jr. | G01W 1/10 702/183 |

OTHER PUBLICATIONS

Taylor et al., Ground-Water-Level Monitoring and the Importance of Long-Term Water-Level Data_U.S. Geological Survey Circular 1217, 2001, U.S. Department of the Interior, pp. 1-68.*

(Continued)

*Primary Examiner* — Sujoy K Kundu
*Assistant Examiner* — L. Anderson
(74) *Attorney, Agent, or Firm* — Alleman Hall Creasman & Tuttle LLP

(57) ABSTRACT

Systems and methods configured to create contour maps of geospatial variables based on hydrometeorological data associated with the variable are described herein. The systems and methods advantageously use simultaneous multi-event universal kriging for spatio-temporal data exploration, analysis and interpolation with the objective of creating a series of related maps, where each map corresponds to a specific sampling event, but wherein some features exhibit spatial relationships persisting over time. In one particular example, water level maps are prepared using the methods, which has the flexibility to allow the conditioning of trend coefficients based on any arbitrary subsets of sample data, and thereby provides a physically based and deterministic rather than wholly-stochastic basis for depicting hydrometeorological data correlations in space and time. The simultaneous MEUK method borrows strength from events possessing a large number of samples to map events possessing fewer data, and allows for implementing "wheel and axle" data analysis.

17 Claims, 16 Drawing Sheets

(56) References Cited

OTHER PUBLICATIONS

EPA, A Systematic Approach for Evaluation of Capture Zones at Pump and Treat Systems_Final Project Report, Jan. 2008, pp. 1-166.*
U.S. Geological Survey Scientific Investigations Report 2008-5059, 2008, U.S. Department of the Interior, pp. 1-14.*
Buto et al., Geospatial Database of Ground-Water Altitude and Depth-to-Ground-Water Data for Utah, 1971-2000, Data Series 302, U.S. Department of the interior U.S. Geological Survey, pp. 1-10.*
Helsel et al., Techniques of Water-Resources Investigations of the United States Geological Survey, Book 4, Hydrologic Analysis and Interpretation, Chapter A3, Statistical Methodd in Water Resources, Chapter 12, Trend Analysis, 2002, pp. 323-355.*
NOAA and University Corporation for Atmospheric Research, Flash Flood Early Warning System Reference Guide, Chapter 3, pp. 3-1 to 3-15.*
Theis, C., "The Effect of a Well on the Flow of a Nearby Stream," Transactions of the American Geophysical Union, vol. 22, No. 3, Jul. 1941, 5 pages.
Glover, R. et al., "River Depletion Resulting from Pumping a Well Near a River," Transactions of the American Geophysical Union, vol. 35, No. 3, Jun. 1954, 3 pages.
Theis, C., "The Source of Water Derived from Wells: Essential Factors Controlling the Response of an Aquifer to Development," United States Department of Interior, Geological Survey, Water Resources Division, Ground Water Branch, Ground Water Notes: Hydraulics, No. 34, Dec. 1957, Reprint of Article published in Civil Engineering Magazine in May 1940, 11 pages.
Todd, D., "Ground Water Hydrology," p. 86, John Wiley & Sons, Inc., New York, Dec. 1959, 4 pages.
Stein, A. et al., "Universal Kriging and Cokriging as a Regression Procedure," Biometrics, vol. 47, No. 2, Jun. 1991, 14 pages.
Press, W. et al., "Numerical Recipes in Fortran 90, vol. 2," Second Edition, Cambridge University Press, London, Sep. 28, 1996, 572 pages. (Submitted in Two Parts).
Deutsch, C. et al, "GSLIB: Geostatistical Software Library and User's Guide," Second Edition, Oxford University Press, New York, Aug. 21, 1997, First Edition Published Feb. 18, 1993, 190 pages.
Tonkin, M. et al., "Kriging Water Levels with a Regional-Linear and Point-Logarithmic Drift," Ground Water, vol. 40, No. 2, Mar.-Apr. 2002, 9 pages.
United States Environmental Protection Agency: Office of Research and Development, "A Systematic Approach for Evaluation of Capture Zones at Pump and Treat Systems: Final Project Report," EPA/600/R-08/003, Jan. 2008, 166 pages.
S.S. Papadopulos & Associates, Inc., "Version 3.0-Beta KT3D_H2O: A Program for Kriging Water Level Data using Hydrologic Drift Terms: User Manual," Aug. 29, 2008, 101 pages.
Karanovic, M. et al., "KT3D_H2O: A Program for Kriging Water Level Data Using Hydrologic Drift Terms," Ground Water, vol. 47, No. 4, Jul.-Aug. 2009, 7 pages.
Peeters, L. et al., "Bayesian Data Fusion for Water Table Interpolation: Incorporating a Hydrogeological Conceptual Model in Kriging," Water Resources Research, vol. 46, No. 8, Aug. 17, 2010, 11 pages.
Lambie, J. et al., "Automated Quasi-Real-Time Assessment of Water Movement from Managed Aquifer Recharge (MAR) Facilities," Poster Presented at Groundwater Resources Association of California Conference on Managed Aquifer Recharge, May 22, 2013, 1 page.
Tonkin, M. et al., "Multi-Event Universal Kriging (MEUK)," Advances in Water Resources, vol. 87, Jan. 2016, Available Online Nov. 19, 2015, 17 pages.

\* cited by examiner

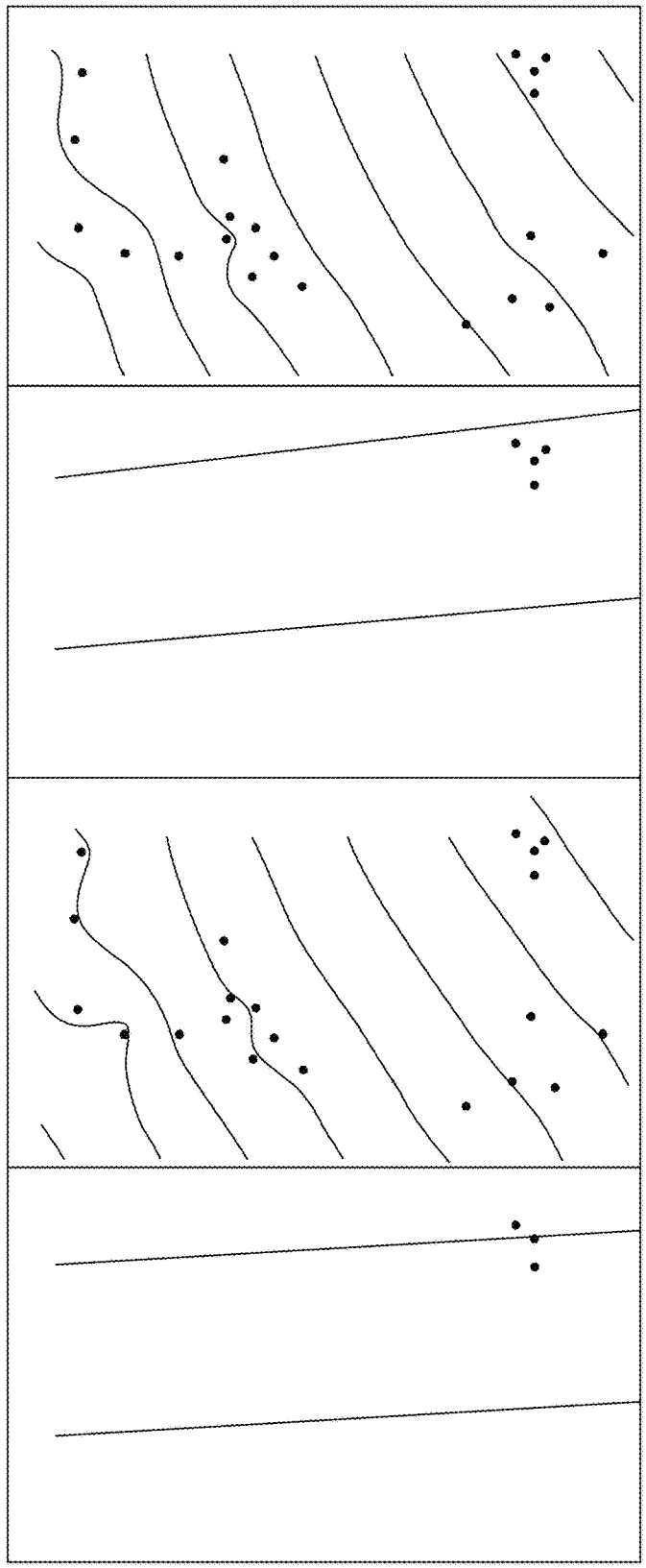

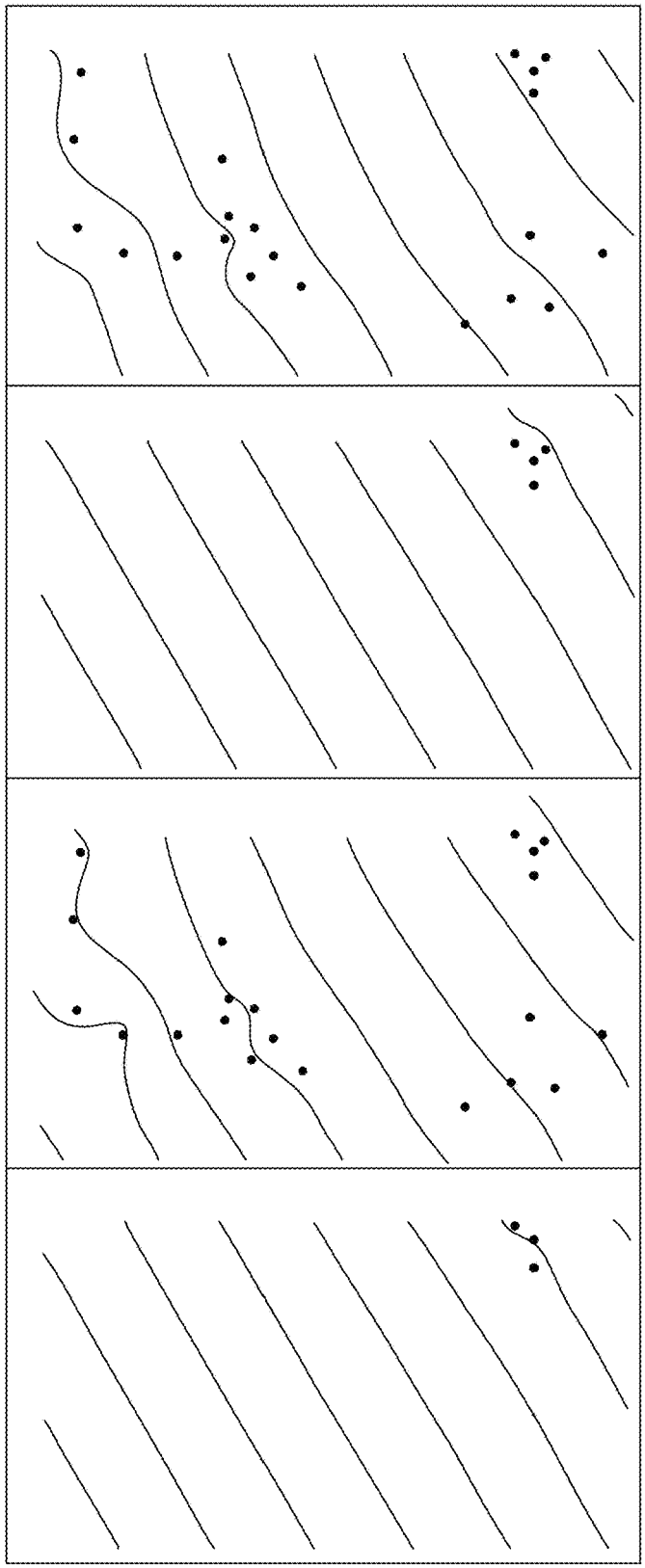

SIMULTANEOUS MULTI-EVENT UNIVERSAL KRIGING METHODS FOR SPATIO-TEMPORAL DATA ANALYSIS AND MAPPING

CROSS REFERENCE TO RELATED APPLICATIONS

This application claims priority to U.S. Provisional Patent Application Ser. No. 61/826,179 filed May 22, 2013, entitled Automated Quasi-Real-Time Assessment of Water Movement from Managed Aquifer Recharge Facilities, the entire disclosure of which is herein incorporated by reference for all purposes.

TECHNICAL FIELD

This application relates to the field of groundwater monitoring and mapping, and in particular to the use of novel kriging methods used therein. Two particular types of application are emphasized—Managed Aquifer Recharge (MAR) and Groundwater Pump-and-Treat (P&T) remediation.

BACKGROUND AND SUMMARY

Understanding the movement of ground water near managed aquifer recharge facilities (MAR) and groundwater pump-and-treat (P&T) systems is critical to their safe, efficient and effective operation. Ground water movement can be rapidly evaluated using automated data processing and mapping to depict groundwater pressures throughout one or more aquifers. For instance, hybrid analytic element/geo-statistical methods can be used to condition groundwater pressure interpolations that include source and sink terms such as wells and percolation ponds. Furthermore, Runge-Kutta integration may be used to track the movement of groundwater and/or contaminants within multiple groundwater potentiometric fields near MAR and P&T facilities. An integrated telemetered system of pressure transducers and flow-rate meters can produce piecewise-continuous data to feed such hybrid algorithms to produce hydraulically conditioned potentiometric maps within moments of data collection. In this way, the potentiometric surface computed at a particular time increment incorporates source and sink terms operating at that instant to produce a sequence of conditioned ("calibrated") potentiometric surfaces that cannot be easily obtained using a numerical model because of the great effort expended to calibrate such numerical models.

Transient potentiometric results have variously been depicted using frequency-based maps. Hybrid interpolation and associated particle tracking algorithms, which may be stationed remotely, on a PC or on a secure website, enable rapid evaluation of P&T and MAR performance. Such methods rely upon kriging variants to interpolate values of a sampled variable to a regular grid suitable for contouring of equivalent groundwater pressures within an aquifer unit or for other purposes. These kriging methods generally use interpolation weights obtained by solving an "event-specific" system of linear equations, which in this context means one system of equations for each time occasion on which sample data are available. For example, universal kriging (UK) incorporates a generalized least-squares (GLS) regression that enables non-stationary variables to be interpolated ("mapped") using a spatially varying mean based on the underlying physics. A UK equation is constructed by combining physically based trend terms. At sites with multiple data sets, UK can be used to sequentially prepare maps for each monitoring event. Methods have also been described that use this approach to interpolate water level data together with the use of particle tracking to construct a capture frequency map (CFM) to evaluate the performance of a P&T system. However, the use of such methods that map each event independently of all other events implies that (i) trend coefficients calculated for each event are unrelated; (ii) sufficient data exists for each event to estimate the trend coefficients; (iii) residuals from the trend are uncorrelated between events; and, (iv) sufficient data exists for each event to estimate a residual semi-variogram. It is very often the case that one or more of these calculations is violated.

The inventors recognized certain shortcomings with such approaches and herein describe a novel method for formulating and solving the kriging matrix equations to create maps that represent a geospatial area based upon spatio-temporal data sets that encompass multiple disparate times (or events). In particular, the inventors describe a "simultaneous" multi-event universal kriging (MEUK) method that uses spatio-temporal interpolation to create a series of related maps, where each map corresponds to a specific sampling event for the geospatial area, but where at least some features within the maps exhibit spatial relationships that persist over time. MEUK was designed specifically to mathematically address the assumptions noted above by constructing a block-diagonal kriging matrix, the structure of which defines trend term relationships between different monitoring events. Thus, MEUK enables simultaneous conditioning of trend coefficients based on any arbitrary user-defined subset of data or the entirety of a multi-event sample data set, which provides a physically-based, quasi-deterministic basis rather than a wholly-stochastic basis for evaluating and mapping data correlations in space and time. In one example provided, a method for preparing groundwater-pressure elevation maps using MEUK is disclosed that produces mapped potentiometric surfaces that can be used to infer the performance of very complex and costly groundwater P&T systems.

The above advantages and other advantages, and features of the present description will be readily apparent from the following Detailed Description when taken alone or in connection with the accompanying drawings. The summary above is provided to introduce in simplified form a selection of concepts that are further described in the Detailed Description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIGS. 12A-13D illustrate example field site contoured UK and MEUK predictions, respectively;

DETAILED DESCRIPTION

Figure 1A:
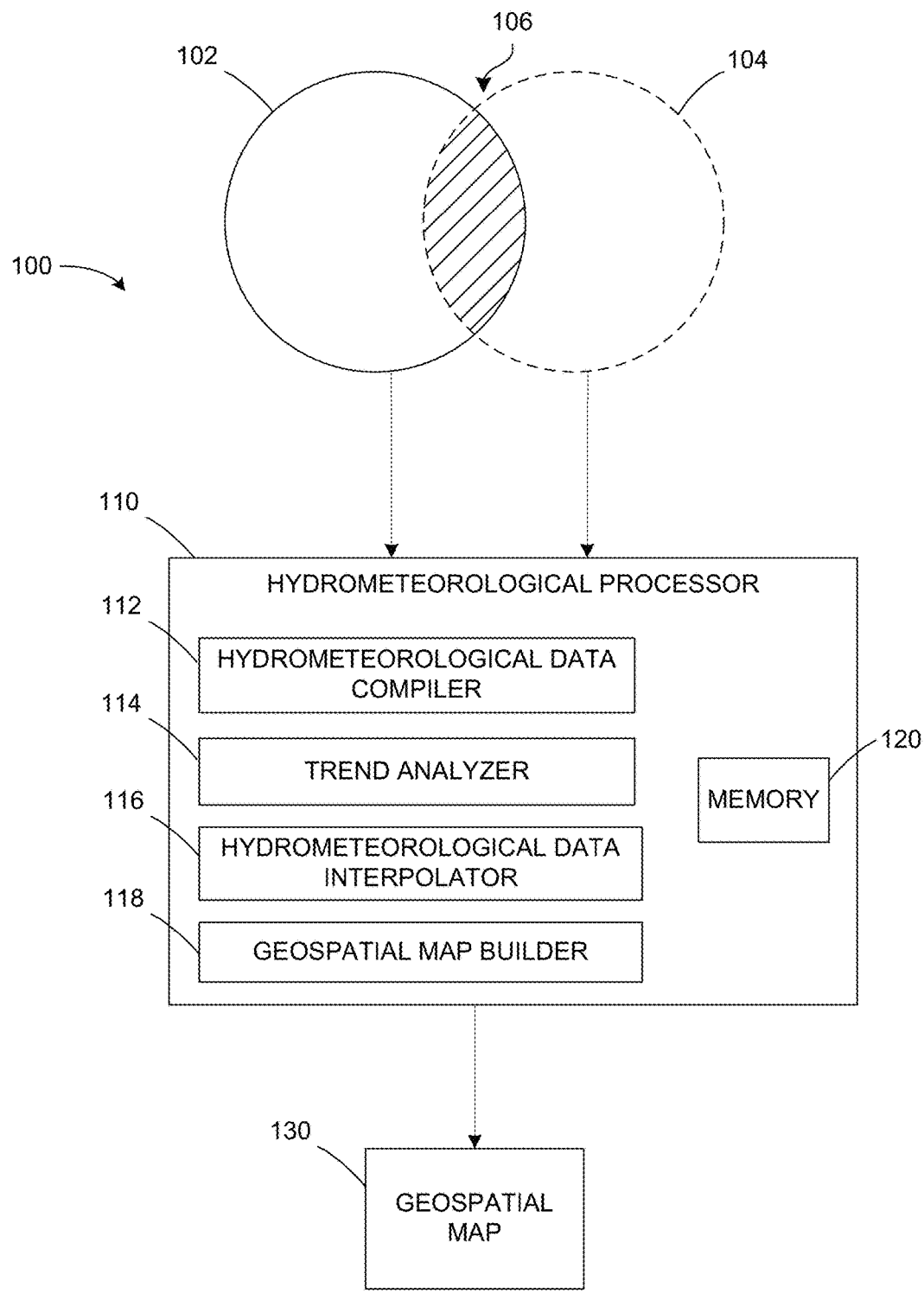
FIGS. 1A and 1B schematically show an example system and method for generating geospatial maps according to the present disclosure.

The subject matter of this disclosure is now described by example and with reference to the illustrated embodiments noted above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

Figure 1B:
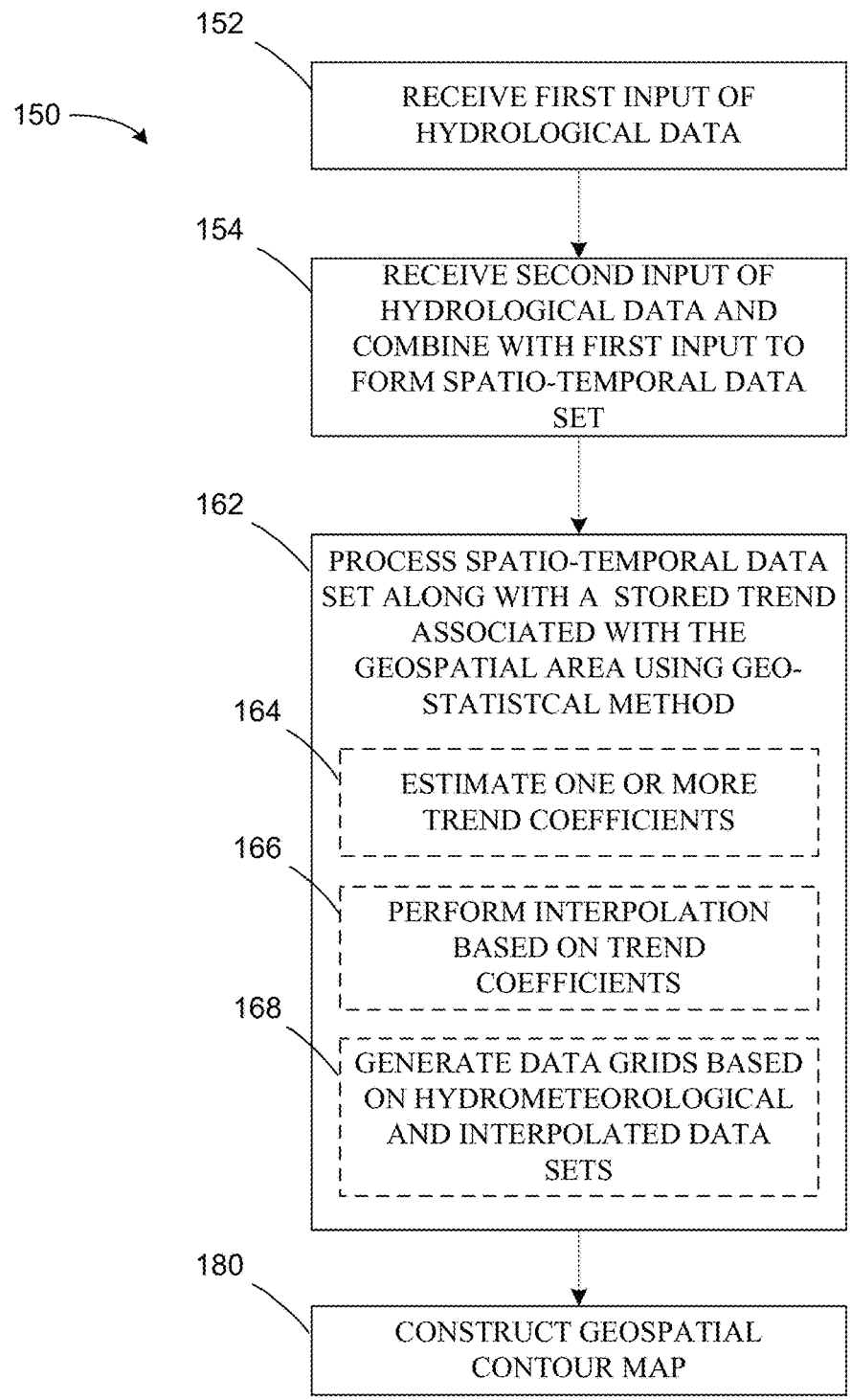

FIGS. 1A and 1B schematically show example system 100 and method 150 for generating geospatial maps using MEUK. Briefly, MEUK uses a spatio-temporal interpolation technique that relies upon a series of related datasets which can be mapped spatio-temporally, where each map corresponds to a specific sampling "event" at a particular time, and that includes at least some spatial features that persist over time, or conversely a spatial mapping that comprises a time related features persisting over time. MEUK is computed using a minimum variance unbiased linear prediction from data obtained in a sequence of sampling events, which is referred to herein as the spatio-temporal data-set. MEUK explicitly assumes that the temporal covariance results from underlying physical or chemical causes, and is not from random stochastic relationships. In practice, MEUK assumes that the stochastic covariance is time invariant; however, unlike a single application of kriging to the entire data set, this assumption is not inherent to the MEUK algorithm. Making the assumption that the most temporal covariance is driven by the underlying physical or chemical processes enables MEUK to simultaneously map multi-event sample data using a combination of (a) trends that vary over time, (b) trends that are invariant over time, and (c) a spatially- and temporally-stationary spatial correlation among the residuals from the combination of these trends. In this way, MEUK offers increased flexibility for implementing hydrometeorological monitoring strategies that occur over extended periods of time.

One advantage of MEUK is that the method is practical to implement with large datasets representing multiple events. As such, MEUK provides a statistically-rigorous yet computationally-efficient method for implementing a "wheel-and-axle" monitoring strategy at the managed facility. In a wheel-and-axle monitoring strategy, a small core group of locations is monitored frequently to track conditions over time (the axle) while a larger group of locations is measured periodically at a lower frequency to provide synoptic depictions of spatial patterns (the wheel). In this way, MEUK may be used to optimize monitoring systems by aiding in the identification of core monitoring stations, which allows for the rate of sampling at the remaining stations to be reduced. In most instances, a reduction in the rate of data acquisition advantageously reduces the cost of the monitoring strategy.

According to the first embodiment, MEUK is demonstrated by application to the mapping of groundwater levels. With respect to FIGS. 1A and 1B, hydrometeorological system 100 may be configured to execute method 150 by processing the hydrometeorological data collected. For example, hydrometeorological system 100 may be a semi-automated software tool that predicts groundwater levels and flow patterns under dynamic stresses such as extraction and re-injection, or managed aquifer recharge. Thereby, although not explicitly indicated, hydrometeorological system 100 may be included within an integrated software system that uses semi-continuous data to support cost-and/or risk-benefit based optimization of groundwater remediation or groundwater supply systems. As one example, Geographic Information Systems (GIS) technology may be used in a computer program stationed remotely on a single computer along with the methods described to perform a hydraulic capture analysis using a series of groundwater potentiometric surface maps created via multiple hydrometeorological data sets. In addition, the technology developed is sufficiently flexible to use data obtained directly or indirectly from interfaces such as Supervisory Control and Data Acquisition (SCADA) systems to record and report time-series (multi-event) data. Then, from the acquired data, hydrometeorological system 100 may report one or more automatically-generated maps to a screen. The maps may be sent to the screen for printing, saved for later analysis; and/or sent along with geospatial coordinates to XML files for subsequent configuration management. Such an integrated software system offers advantages over existing methods since groundwater level and system flow data may be collected and interpolated (mapped) at high frequency with a lower computational and financial cost since the efficient matrix methods expedite calculation and maximize the wall of the collected data.

System 100 and method 150 further enable simplified yet comprehensive long term monitoring strategies for groundwater elevation data. As such, according to the methods herein, objective and rapid evaluation of changes in groundwater pressures may occur with increased accuracy. For example, the extent and variability of time-dependent hydraulic capture and reduced cost of P&T and MAR system operations via a reduction in data collection, analysis and reporting costs; more accurate data-driven estimates of time-dependent hydraulic capture and recharge zones; verification of conceptual models of aquifer system hydraulic interactions from spatio-temporal correlation of groundwater pressures. These benefits can be obtained via automated operation of the methods in continuous mode without continuous attention from staff, as a result of the methods described.

Turning to a description of the system and methods, at 102, a first set of hydrological data-collection stations (e.g., sensors) or field observation data collected manually or from other field data sources (e.g., via a quantifiable field-based measurements) is represented by a first circle. Then, as shown at box 152 of method 150, the first set of data from hydrological data-collection stations (e.g., sensors) are configured to receive a requisite but non-specific temporal and spatial structure associated with a first point in time, which in practice is referred to as a first event dataset. As one example, the first event dataset may represent a first set of field measurements from hydrological data-collection stations (e.g., sensors), e.g., groundwater extraction rate data from an electronic flow meter and groundwater levels from one or more wells instrumented with hydraulic pressure sensors in the aquifer from which groundwater is being extracted contemporaneously, such that both receive the same temporal marking indicating the first event data. Alternatively, as another example, the first event data set may comprise input from field measurements of hydrological data from a database, a sensor, and/or data from a SCADA data historian or other form of data to be kriged for multi-event analysis of time or spatial variables. Upon acquisition, the data may be sent to hydrometeorological processor 110 that further processes the data to make predictions under dynamic stresses.

At 104, a second set of hydrological data-collection stations (e.g., sensors) is represented by a second circle. Although the description according to the present disclosure includes first and second sets of discrete hydrological data-collection stations (e.g., sensors), in some instance, there may be overlap between the different sets of hydrological data-collection stations (e.g., sensors) such that a there is overlap in the data collection stations used to acquire the temporal data, which is indicated by overlap region 106. However, it is not necessary that all data collection stations used for spatio-temporal analysis be measured within each dataset. To the contrary, one fundamental advantage of the presented MEUK method is to enable comprehension of a system state or condition such as groundwater pressures throughout an aquifer with fewer than all (e.g., a subset of) available spatial observation locations or sensors in space or in time. According to the method, the series of spatio-temporal data sets collected may flexibly include receiving hydrometeorological data from different sets of hydrological data-collection stations (e.g., sensors) among the various data sets collected, which is shown at box 154. Overlap region 106 schematically indicates that a portion of the hydrometeorological data may be received from hydrological data-collection stations (e.g., sensors) that are the same for each data set. Said differently, one or more sets of hydrometeorological data-collection stations (e.g., sensors) may provide data to hydrometeorological processor 110 at different frequencies or at different times such that the data sets collected may be different. Although FIGS. 1A and 1B are described using two sets of data-collection stations (e.g., sensors) for simplicity, in some embodiments, more data and sensor sets (e.g., 3, 4, . . . , N) may receive and transmit data from the geospatial area to hydrometeorological processor 110. Therefore, one fundamental advantage of MEUK is that various data may be obtained within each spatio-temporal data set in combination with different hydrometeorological data-collection stations (e.g., sensors). In this sense, field monitoring strategies may be designed and implemented to conserve resources, for instance, by reducing the frequency of data acquisition from one or more field-based sensors. With regards to the collection of data from the second set of hydrological data-collection stations (e.g., sensors), the data-collection stations (e.g., sensors) may be configured to receive at least a second input that is associated with one or more time points and represents events associated with different data sets.

After data collection, the first input and the (at least) second input may then be combined into a series of spatio-temporal data sets for processing by hydrometeorological processor 110. Thus, hydrometerological processor 110 may obtain input from the first set of hydrological data-collection stations (e.g., sensors) 102 as well as the second set of hydrological data-collection stations (e.g., sensors) 104. However, this is non-limiting, and in some embodiments, spatio-temporal data sets may advantageously be received from additional sets of hydrological data-collection stations (e.g., sensors) or spatio-temporal data collection stations. In still other embodiments, the first and second sets of hydrological data-collection stations (e.g., sensors) may comprise substantially the same measured variables and data-collection stations (e.g., sensors) to be processed via the methods. In other words, overlap region 106 may overlap either minimally, substantially or entirely with the first set of hydrological data-collection stations (e.g., sensors) 102. In some implementations, the data-collection stations may be configured to aggregate the collected data remotely prior to processing by hydrometeorological processor 110.

At 110, hydrometeorological system 100 may include hydrometeorological compiler 112, which may process the received first input and the (at least) second input along with one or more trends associated with the geospatial area using a geo-statistical method, which is indicated at box 162.

At 114, trend analyzer 114 may execute box 164 of method 150 to estimate one or more trend coefficients based on either all or a suitable subset of, at the analyzers discretion, the compiled series of spatio-temporal data sets. Thus, hydrometeorological system 100 may be configured with a memory unit 120 that stores one (or more) mathematical expressions of one or more physical or chemical trends associated with the geospatial area in addition to the series of spatio-temporal data sets received from the hydrological data-collection stations (e.g., sensors).

As such, one or more site conceptual models may be incorporated within the data acquisition strategy that is automatically proposed as causing the correlation observed in the data received. For instance, MEUK estimates of time-dependent potentiometric surfaces and resulting hydraulic capture zones for P&T systems may be tested for robustness via cross-validation techniques in order to assess the dependence of outcomes on particular data points and/or particular trends within a dataset. Thus, the cross-validation analysis (or leave-one-out analysis) may be used to evaluate both the data and the underlying conceptual model as implemented via kriging drift terms. Such analyses may be accomplished by iteratively removing either (a) single data points or groups of data points; (b) single drift terms or groups of drift terms; or (c) by recasting the definition of drift terms in different ways—such as, making alternative assumptions about spatio-temporal relationships. The strength of such cross-validation techniques is that they may be rapidly executed using the MEUK method described herein.

Continuing with a description of the system and method, hydrometeorological processor 110 may further use hydrometeorological interpolator 116 to predict data points at locations intermediate to actual field (observed) data points, as indicated at box 166. In this way, locations that are intermediate to actual field (observed) data points within the geographical area are based at least partially but usually in the majority on the trends and estimated trend coefficients obtained by solving the MEUK system of equations. In particular, simultaneous MEUK-based interpolation allows for a series of related maps to be created, wherein each map corresponds to a different sampling event, but wherein the maps exhibit spatial relationships that persist over time. Thus, simultaneous MEUK enables conditioning of trend coefficients based on any arbitrary subset of data or via the entirety of the multi-event sample data, which provides for monitoring data correlations in both space and time.

Hydrometeorological system 100 further includes geospatial map builder 118 that generates grids of data suitable for contouring based on the hydrometeorological data collected, which is indicated at box 168. In this way, the system and methods described may use the series of related maps to create a single map depicting, e.g., a capture zone, calculated using data from multiple monitoring events. Therefore, hydrometeorological processor 110 may further construct geospatial map 130 that represents the geospatial area based on the series of spatio-temporal data sets via box 180. Although not shown explicitly, the system and methods further include outputting the map as calculated in a format suitable for use, for example, on a computer screen or for printing for review by one or more individuals.

The configurations described above enable various methods for semi-automated assessment of water movement from managed aquifer facilities according to the present disclosure. Accordingly, some such methods are now described, by way of example, with continued reference to the above configurations. It will be understood, however, that the methods herein described, and others fully within the scope of this disclosure, may be enabled via other configurations as well.

Figure 2:
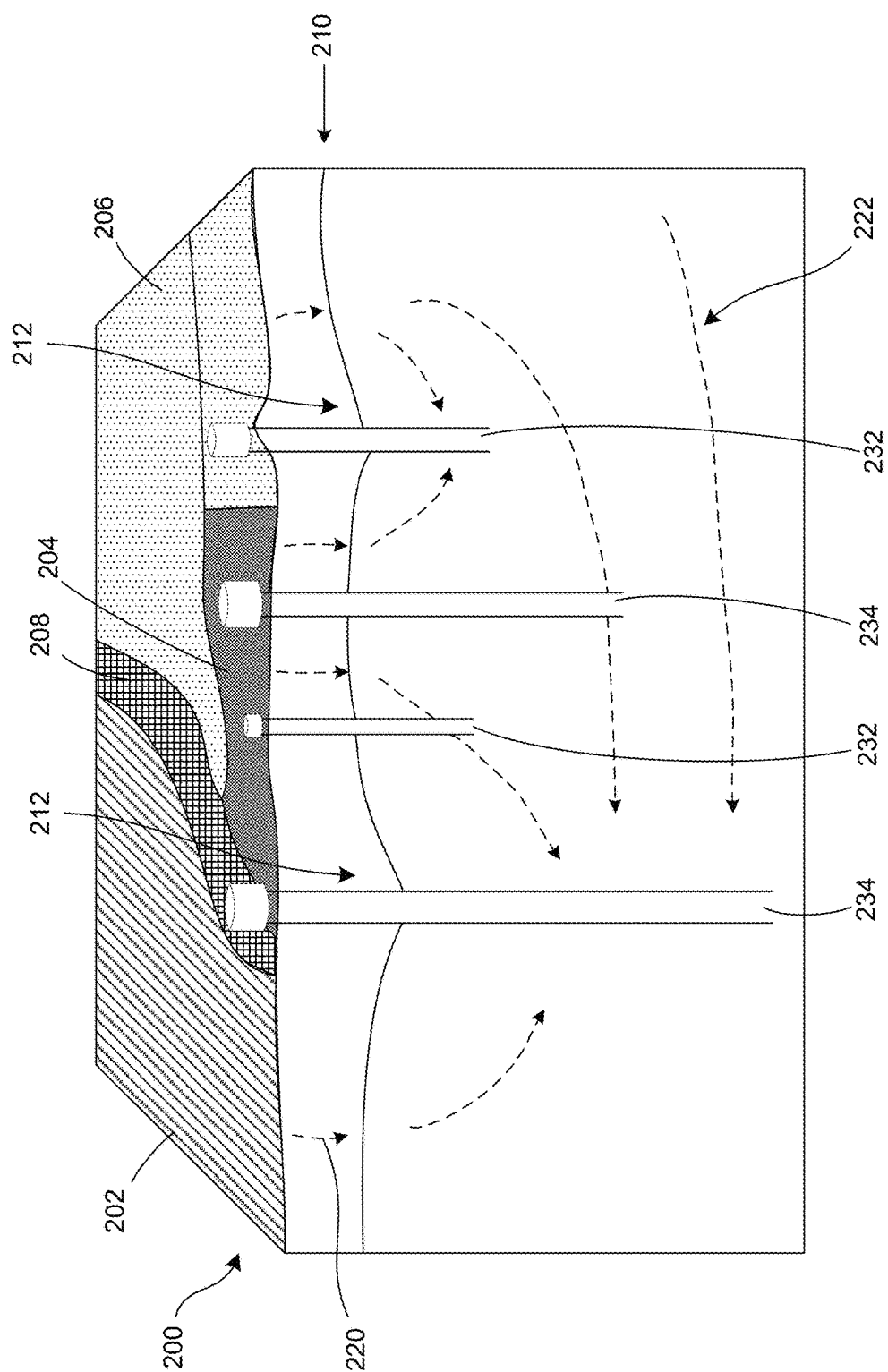
FIG. 2 illustrates an example managed aquifer geospatial area according to a first embodiment of the present disclosure.

Turning to a description of the geospatial area according to the first embodiment, FIG. 2 shows an example aquifer remediation scheme for reference. Briefly, legacy pollution of groundwater aquifers exists at hundreds of locations throughout the United States (e.g., the Superfund list exceeds 1,300 sites) and at thousands of locations around the world. Legacy contamination issues pose a substantial threat to human health as well as the environment. In response, the department of energy (DOE) and other oversight agencies often design, install and operate hydraulic control and remediation systems using extraction wells (e.g., P&T systems). It is also common for some of these systems to operate in complex hydrogeologic settings. Failed hydraulic capture of groundwater pollution may contribute to and result in deleterious impacts to human health. For example, in the City of Cheyenne, Wyo., the negative impact from solvents released from the U.S. Department of Defense's Atlas IV missile site had tremendous consequences on the drinking-water supply wells in the Ogallala Aquifer. Therefore, maintaining hydraulic capture of contamination via these extraction well containment systems is useful for protecting human health. Moreover, with respect to large scale pollution, for example, such as has been found at the DOE legacy Hanford Site in Washington State, the time frame for hydraulic control has the potential to exceed many tens of years, which makes low-cost operational effectiveness and data integrity a high priority. Therefore, improved methods for long-term monitoring (e.g., for one-year, ten-year, and one hundred-year time frames) of subsurface systems using integrated sensor networks may be a benefit to many operational facilities.

For this reason, in FIG. 2, aquifer 200 is shown along with various example features to illustrate one type of environment where the methods herein may be advantageously implemented. An aquifer is an underground layer of water-bearing permeable rock or unconsolidated materials (e.g., gravel, sand, or silt) from which groundwater can be extracted via a water well. Hydrogeology collectively refers to the study of water flow in aquifers. Within FIG. 2, aquifer 200 includes various features to illustrate an example surface/subsurface system.

Surface features of aquifer 200 include first region 202 that is at a higher elevation compared to second region 204 and third region 206. For example, first region 202 may be a forested hillside or mountainous region associated with aquifer 200. As shown, first region 202 that is adjacent to second region 204 and third region 206 may have a different soil composition and so absorb water at a different rate based on surface features present. For example, second region 204 may be a grassy field while third region 206 is a relatively arid dry-land. Furthermore, first region 202 may be separated from the other regions via transition region 208, which in one instance, may be a river or stream that collects water from the more elevated region for distribution away from the aquifer. However, some of the water present may also be distributed within aquifer 200. In this way, the topographical surface features shown may interact differently with the subsurface regions present to collect water while transporting the water to the subsurface region within aquifer 200.

Subsurface features within aquifer 200 include water table 210, which represents a subsurface region where the water hydraulic head is equal to atmospheric pressure. For simplicity and convenience, water table 210 is visualized as a surface within the subsurface materials that represents saturated groundwater. Water table 210 further includes cone of depression 212 that may occur in an aquifer when groundwater is pumped from a water well. For example, in an unconfined aquifer, the cone of depression of the water table is a depression of the water level therein. However, in a confined aquifer (e.g., an artesian aquifer), the cone of depression represents a reduction in the pressure head surrounding a pumped well. Thus, when a well is pumped, the water level in the well itself is lowered, which has the effect of creating a localized gradient between the water in the surrounding aquifer and the water in the well, which produces a flow of water from the surrounding aquifer into the well. The water level or pressure head in the aquifer around the well decreases such that the decline decreases as a function of distance from the well, which produces the cone-shaped depression shown radiating out from the well. This conical-shaped feature is referred to as the cone of depression. Also shown within the subsurface region is a groundwater recharge 220 that refers to deep drainage or deep percolation (e.g., hydrologic process) where water moves downward from land surface to the groundwater. This process often occurs as a flux to the water table surface. Groundwater flow 222 (several are shown) refers to water that has infiltrated the ground, moves within the aquifer, and has been or will ultimately discharge into a stream, lake, or the ocean.

Because the occurrence, movement, and quality of the groundwater is complex due to the deep, layered, heterogeneous aquifer system, earthquake faults, sea water intrusion, recharge ponds, pumping patterns and barrier injection wells that exist in the basins, substantially perfect direct observations into the earth to view the conditions of the aquifers are not possible. For this reason, ground water wells are relied upon to provide "local" measurements of groundwater level and aquifer information. For simplicity, in FIG. 2, two types of wells are shown that extend from the surface region into the subsurface region. Aquifer-specific monitoring wells 232 are included to measure water levels within an aquifer. These wells provide specific groundwater levels and groundwater quality information for the individual aquifers they intercept and thereby eliminate the averaging of water levels across multiple aquifers that may lead to erroneous interpretations of water levels and water quality within a particular well. Supply wells 234 are (high capacity) production wells that are sometimes used as the primary source of information for monitoring water levels because of their availability and convenience. However, although these wells are suitable for water supply purposes, they may not be reliable for groundwater level and groundwater quality data interpolation (mapping) if they have long screens that cross more than one aquifer.

Methods and equipment now exist that enable automated acquisition and processing of the types of monitoring groundwater data just described. For example, the hydrological data-collection stations (e.g., sensors) may include electronic sensors that are configured to take pressure readings, and/or electronic data recorders with data communications telemetry. As such, technological advances in data telemetry, electronic sensors, and databases enable automated data acquisition to facilitate predicting movement of groundwater under dynamic stresses, as well as testing site conceptual models using methods that can incorporate high frequency data sets.

Advances in data recording via pressure transducers and data loggers, for electronic measurement of water pressure enables more frequent data collection than was previously available. Electronic sensors have been developed from a variety of manufacturers including, for example, GENERAL ELECTRIC and SCHLUMBERGER. These pressure transducers and data recorders are designed to run on a low current which saves power by, for instance, awakening to record data before returning to "sleep" mode. The availability of such low power sensors enables collection of pressure data at remote locations via battery power. In addition, the availability of such low-powered sensors at relatively low cost enables a higher frequency collection of data that enables more advanced spatio-temporal analysis of the large data sets that result.

Data recorders have also advanced along with the advances in sensor technology. For example, data recorders are now able to collect, record, and transmit remote measurement data to a central location quickly and automatically. Improvements in the size (e.g., smaller size) and power requirements allow sensors to be deployed and continually record data for periods of years or longer. Advance in low-cost methods for data transmission or data telemetry can now be implemented using, e.g., cell-phone towers for digital radio transmission and data bursts. In addition, methods such as line of sight radio and satellite links may also be used in combination or in place of cell-phone towers. Therefore, automated collection of sensor data now provides large inexpensive datasets with a high frequency that allows for advanced analysis and spatio-temporal mapping of the recorded data, such as groundwater pressures.

GIS technology has also advanced rapidly and can now be configured to hold dynamic datasets for fixed geographic areas. For example, GIS tools now exist both in the open source software community (such as MapWindow; Idaho State Geospatial Software Lab. 2008) and in the commercial software community (via ESRI and its suite of ArcMap products). However, although these advanced GIS tools enable very generic analysis of groundwater elevations and groundwater flow based on actual data, they are not configured to properly account for the underlying physics of chemistry when analyzing and mapping those data.

Therefore, new methods for data conditioning, spatial correlation analysis, and data mapping have been developed in recent years. In particular, methods for spatial interpolation and correlation provide for data conditioning and constrained data mapping that provides realistic representations of groundwater flow directions and hydraulic capture to supply wells or away from recharge locations. As such, data conditioning and analytic methods may be further used for pressure mapping of groundwater water in relation to surface water discharges and groundwater discharges (e.g., KT3D software program; Deutsch, C. and A. Journel 1992. GSLIB: Geostatisitcal Software Library and User's Guide. New York: Oxford University Press). These groundwater pressure distributions (or maps) provide "surfaces" that further enable particle tracking algorithms to produce robust evaluations of water movement from surface water through the groundwater and vice versa.

Turning to the first embodiment, managed aquifers may benefit from both hardware and software at the wellhead and at a client site, for example, a water treatment plant. In one embodiment, hardware may include electronic sensors and flow meters, as well as data storage and communications devices while software includes data acquisition software that is configured to receive a data stream comprising one or more data sets from project hardware, as well as components for polling, storing, and analyzing the data sets.

For example, hardware for taking measurements at Wellheads may include: Production Wells (which may serve as an observation well when not in operation)—pressure transducers, electronic flow meters, line pressure recorders above pump; Observation Wells—pressure transducers, interim data storage [(e.g., Datalogger, data acquisition unit (DAQ)], Remote SCADA PLC, communication such as wireless or wired telecommunications (e.g., radio at wellhead), manual data collection port.

In addition, software for data acquisition may include SCADA with Data Historian, secure one-way polling of the Data Historian, an external database that interacts with Data Historian and not SCADA, SCADA pushing to external SQL database, DAQ, GOES network, and/or cell phone towers. The SQL database may be further configured to store and time-stamp data collected from one or more wells, store time-stamped data from polled resources, use online USGS stream gaging stations, incorporate data from an observation well outside of the system, and/or include an online NOAA tidal observation data.

Figure 3:
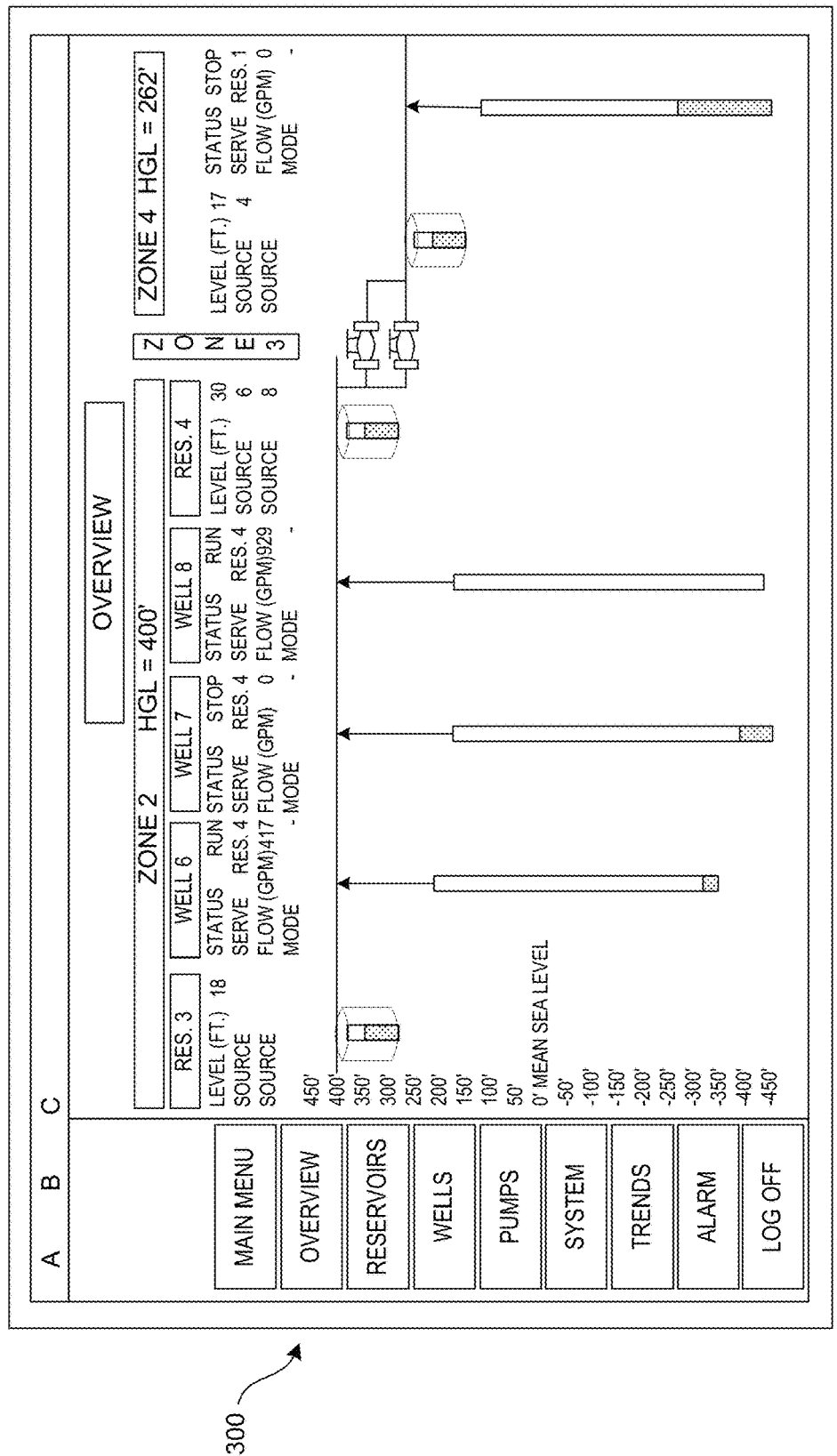
FIG. 3 illustrates an example software tool for monitoring and/or managing the geospatial area according to the first embodiment.

Turning to the MEUK methods with respect to an aquifer (such as aquifer 200), FIG. 3 illustrates example software tool 300 for monitoring and/or managing the geospatial area according to the first embodiment. As described, the methods allow for a software tool capable of evaluating the extent of hydraulic containment within the managed aquifer, as well as the time-dependent capture zone for one or more groundwater extraction wells using high-frequency groundwater pressure data and extraction-well flow-rate data. Furthermore, as described in greater detail below, FIG. 4 schematically depicts an MEUK block-diagonal matrix that may be used to produce the example ground water level map of FIG. 5, which schematically illustrates an example ground water level map 500.

In the embodiment shown, software tool 300 is a fully-automated or semi-automated tool for predicting groundwater flow in aquifers (e.g., aquifer 200) that are under dynamic stresses such as extraction and re-injection or managed recharge. For example, the tools may be incorporated into an integrated software system that provides analyses using semi-continuous data that is collected to support a cost- and/or risk-benefit based optimization of both groundwater remediation and groundwater supply systems. As such, the algorithm may be configured to utilize advanced meteorological data comprising regional precipitation and barometric pressures while correlating such data to the system stresses within the groundwater system state (e.g., pressure elevations). Moreover, the method may further produce informative maps of time-dependent groundwater levels and capture zones to extraction wells from a rigorous mathematical mapping of groundwater pressures over time using the methods of spatio-temporal interpolation according to the present disclosure. As such, the system according to the present description may be advantageously used to monitor a managed aquifer in real-time.

In this regard, as one example, software tool 300 may obtain a historic high-frequency dataset from an existing groundwater extraction wellfield that is configured to include pumped-well and monitoring-well pressure heads, as well as corresponding flow rates. Software tool 300 may be further configured to analyze data-correlations for groundwater elevation/pressure responses due to extraction pumping, climate and river stage via generalized linear regression techniques. Then, software tool 300 may include instructions executable by a device (e.g., a computer) to automatically examine spatio-temporal patterns using the regression (estimation) capabilities of MEUK. As described in detail below, MEUK may then be used to produce pressure maps using extraction well pumping rates and groundwater pressure readings from observation wells while further producing time-dependent hydraulic capture zones for the groundwater extraction wells over the period of data recorded.

Figure 4:
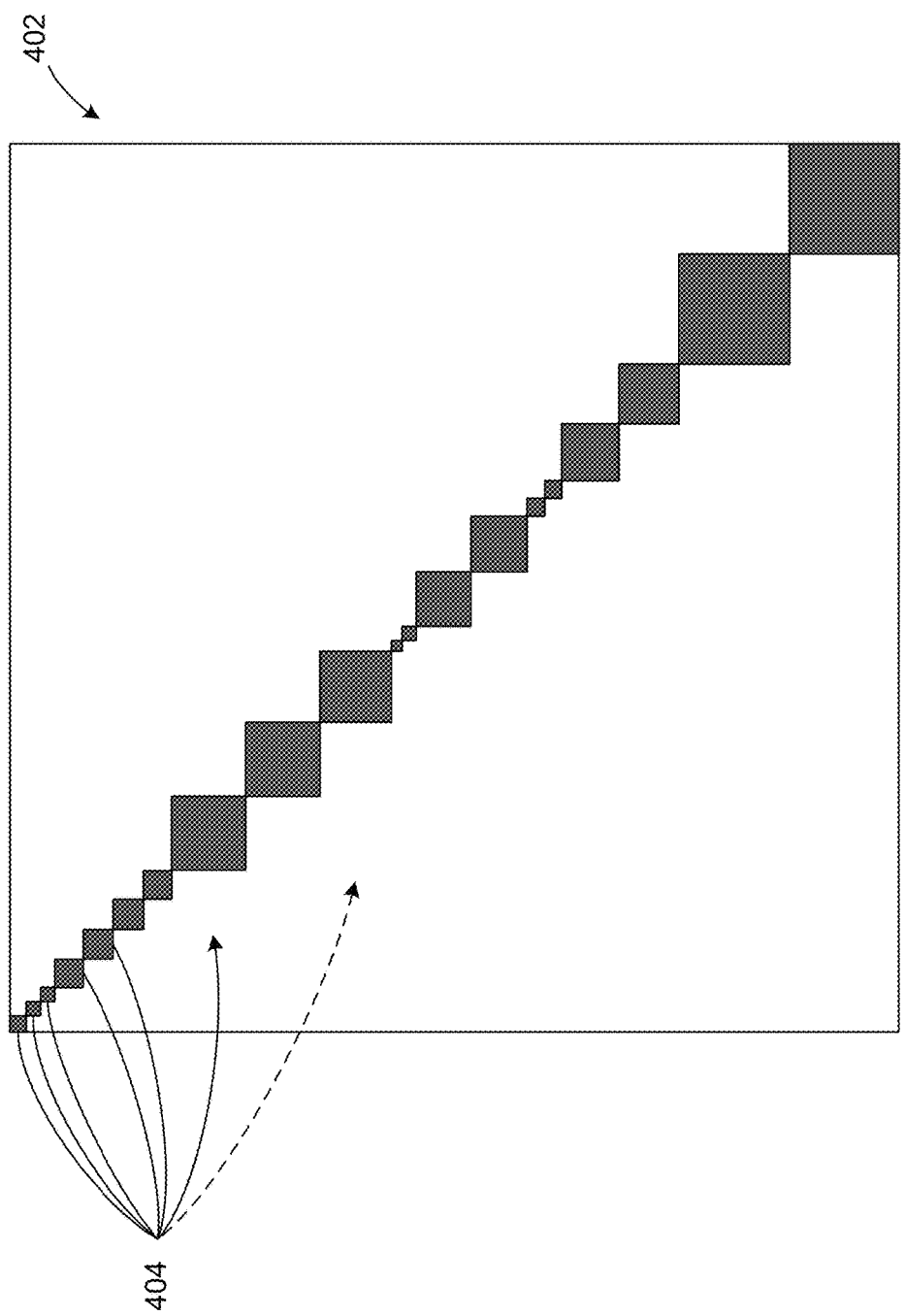
FIG. 4 schematically depicts an example MEUK block-diagonal matrix for producing the example water level maps shown in FIG. 5.

FIG. 4 illustrates how block-diagonal matrix 402 is constructed according to the MEUK methods. For instance, equations 11-13 below describe how MEUK matrices may be resolved into individual events that are combined to form the MEUK matrix that advantageously allows for increased processing speed and/or flexibility in data monitoring strategies. Block-diagonal matrix 402 schematically includes event input 404 that is shown as an individual block. Thus, the block-diagonal matrix 402 shown includes data input from 20 events, which may include different data sets received from different data-collection stations (e.g., sensors) within the geospatial area. For this reason, the individual blocks are further shown having variable sizes since the methods allow for large data acquisition flexibility between different events. As described herein, data acquisition flexibility allows monitoring systems to use fewer resources, since not all data-collection stations (e.g., sensors) have to be run continuously. Use of fewer resources further allows for reduction in costs.

Figure 5:
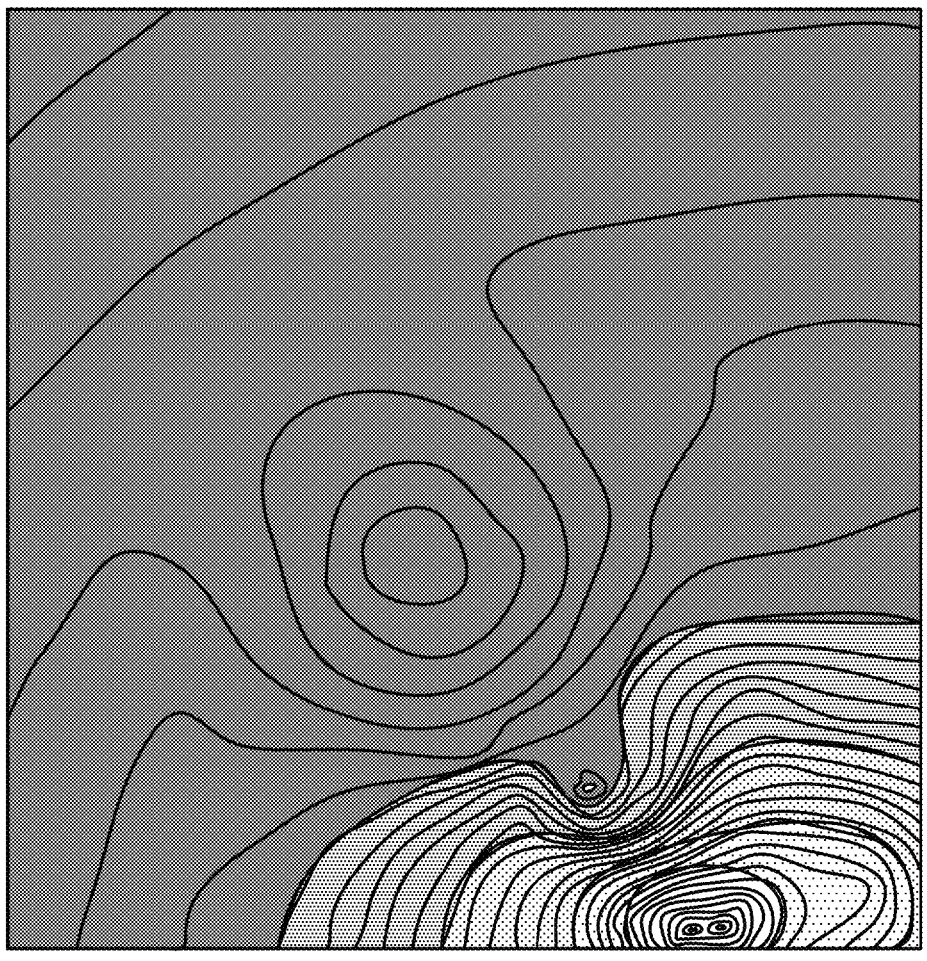
FIG. 5 schematically illustrates an example water level map produced by the MEUK methods described.

FIG. 5 shows example water level map 500 that may be produced via the MEUK method described. Although shown schematically, groundwater level contours shown indicate the depths of various subsurface water levels while the different shaded regions may be added to visually indicate the water level gradient within the aquifer. In some instances, the water level gradient may be used to indicate a capture zone for a pumped well.

With respect to modeling groundwater flows, analytical and numerical models developed for describing groundwater flow often estimate hydraulic-capture of extraction wells without accurately incorporating the physical properties of the groundwater flow system embodied within the mathematical model. That is, it is unknown in advance of obtaining field data, what inputs to use in such analytical and numerical models. In addition, difficulties arise when conditioning such deterministic models on the basis of field data such as groundwater potentiometric heads, which is why such deterministic models often produce disappointing results. For example, the mathematical boundary conditions and multitude of modeling parameters are often poorly constrained since they rely upon measured data and other independent information that provides insufficient resolution of the hydraulic capture of groundwater. This difficulty is further compounded when computing time-varying hydraulic capture zones. The U.S. Environmental Protection Agency (U.S. EPA) recognized this point in their 2008 guidance on groundwater hydraulic capture zone analysis when it concluded that both measured data interpretation methods and deterministic models are needed when evaluating hydraulic capture for pump and treat systems. It was further noted by the U.S. EPA that failed capture may result in deleterious impacts to a public drinking water supply or adjoining water bodies. The method recommended by the U.S. EPA therefore included using enhanced measures of field data on groundwater pressures to evaluate the pressure field around groundwater extraction wells. However, the various methodologies for hydraulic capture suggested by the U.S. EPA (2008) that existed at that time are limited to making singular estimates (e.g., at one time interval or event) of the potentiometric surface around an extraction wellfield rather than multiple spatio-temporal estimates that incorporate a dynamic analysis of the potentiometric surfaces over time. In this way, the estimates of hydraulic capture are based on an unrealistic expectation that the groundwater potentiometric surfaces remain constant over time, when in fact they may vary dramatically due to changes in groundwater extraction and recharge rates. Furthermore, based on the suggested methods that existed at that time (2008) for estimating hydraulic capture from field data, much of the interpretation is left to the unquantifiable judgment of an individual or team developing the capture estimates. As such, the current methods are subject to error and inaccuracy due to a lack of objectivity within the capture analysis, which the MEUK method herein advantageously addresses.

For instance, using the methods according to the present disclosure, an objective hydraulic capture analysis may be achieved by using methods for simultaneous spatio-temporal analysis of groundwater pressure data. Such methods provide for formal mathematical conditioning and mathematically constrained data interpolation to provide realistic representations of groundwater pressures, flow directions, and hydraulic capture to remedial and drinking-water extraction wells. Coupling these methods with advanced spatio-temporal correlation techniques for determining well groupings, objective verification of site conceptual models and aquifer interactions is enabled, which allows for the automated mapping of groundwater pressures. By automating field data collection, the dollar cost for higher frequency data collection and subsequent mapping may be reduced accordingly. Thus, the accuracy of hydraulic capture estimates can be enhanced by decreasing the time intervals for data collection, which allows for hydraulic capture areas to well(s) to be enabled with more accuracy and with associated measures of the uncertainty in those estimates.

A superior technology is thus provided that can be used to objectively test and map groundwater capture-zones to pumped wells or flows from recharge zones. Moreover, the simultaneous MEUK method provides for a more insightful analysis of spatio-temporal datasets by including the physics relating to the actual flow in the subsurface, which further enables robust testing of conceptual models.

With respect to the kriging methods, UK, which includes ordinary kriging as a special case, is now described along with a brief description of MEUK. UK may be used for interpolating certain types of spatial data since it enables a trend to be included within the system of kriging equations. The form of the trend is defined by the analyst and the corresponding coefficients are obtained using a generalized least-squares regression (or GLS). In other words, a "best-fit" to the spatial data is obtained via fitting of the trend using GLS. It should be noted that although UK and GLS each seek a minimum variance solution to a system of linear equations, the objective of GLS is to identify values of the trend coefficients, whereas the objective of kriging is to interpolate sampled data in order to obtain estimates at un-sampled locations that may be relied upon to produce maps. However, despite these differing objectives, implementing UK is effectively implementing a GLS regression.

Conversely, MEUK was developed to produce a sequence of related maps from sample data obtained on multiple occasions separated in time referred to herein as "events". Unlike UK; however, which computes interpolation weights by solving a GLS regression separately for each sample event by constructing and solving a system of equations using the data obtained only from that event, MEUK computes interpolation weights for all events simultaneously by constructing and solving a single system of equations based on the spatio-temporal data from all events. This enables MEUK to achieve consistent estimates of trend parameters over time. Furthermore, MEUK allows for intensive computations to be more easily performed. For example, traditional interpolative methods may present a computational challenge for sites having many observations per event and/or many events, where it is not unusual to collect hundreds of observations per event for tens or hundreds of events. Such data sets would render the dimensions of the usual kriging matrix into the thousands or even tens of thousands, which is especially problematic for mapping applications, where millions of prediction points may be used. As is detailed below, problems of this magnitude and size are handled by formulating the MEUK kriging matrix to take advantage of certain matrix solving procedures that are adapted to a sparse block diagonal matrix structure.

UK generally comprises two procedures, one of estimation and the other of prediction, carried out in the context of a GLS model. The GLS model supposes that the sample data $z_i$ (i=1, 2, ..., n) are the result of random deviations around a trend, and that those deviations are correlated. Herein, a trend is meant in the general sense of a value that can be determined by a linear combination of p unknown coefficients (or parameters) $\beta=(\beta_1, \beta_2, \ldots, \beta_p)'$ [Vectors, by default, are column vectors. A prime, designating the transpose, identifies a row vector.] At any location within a study area there is available a tuple of numerical attributes $y=(y_1, y_2, \ldots, y_p)'$ termed independent variables or covariates. As one example, when mapping groundwater elevations, $y_1$ may be a constant (e.g., $y_1$=1), $y_2$ and $y_3$ as spatial ordinates, and the additional $y_i$ as the logarithm of the distance to pumped wells. Thereby, at each data location i, in addition to its covariates $y_i=(y_{i1}, y_{i2}, \ldots, y_{ip})'$, the observation $z_i$ is considered to be a realization of a random variable $Z_i$. Thus, the following linear combination results that expresses the expected value $Z_i$ in terms of $\beta$, which is the value of the trend at location i:

$$E[Z_i]=y_i'\beta=y_{i1}\beta_1+y_{i2}\beta_2+\ldots+y_{ip}\beta_p \quad (1)$$

Estimation uses the data to find values that represent the unknown parameters $\beta_i$, whereas prediction uses the data at location i=1, 2, ..., n to compute a value at an un-sampled location, indexed as i=0 here. The targets of estimation are deterministic (non-random) parameters whereas the target of prediction $z_0$ includes a random fluctuation around its trend value $y_0'\beta$. Predictions are made for multiple locations using the same data by varying location 0. Often, predictions are made at a regular grid of points suitable for contouring.

Classical kriging assumes the random fluctuations $Z_i$ have expected values of zero and their covariances are known. Then, if the covariance between $Z_i$ and $Z_j$ is written as $c_{ij}$, the covariance can be used to perform an estimation using GLS. Its solution can be written as the following:

$$\hat{\beta}=Hz, H=(Y'C^{-1}Y)^{-1}Y'C^{-1} \quad (2)$$

where $z=(z_1, z_2, \ldots, z_n)$ is the n-vector of observations, $Y=(y_{ij})$ is the n by p matrix whose rows are the vectors $y_i'$, $1 \le i \le n$, and $C=(c_{ij})$ is the n-by-n covariance matrix that is assumed invertible. The p-by-n matrix H, which projects the data z onto the parameter estimates $\hat{\beta}$, which is called the hat matrix. The formulation of $\hat{\beta}$ as the application of the hat matrix to the data explicitly shows how the parameter estimates depend linearly on the data. The covariances $C=(c_{ij})$ are classically computed using a variogram which gives the covariance in terms of the data separation distances.

Prediction further includes using UK to predict $z_0$ as a linear combination of the data, as follows:

$$\hat{z}_0=\lambda_1 z_1+\lambda_2 z_2+\ldots+\lambda_n z_n=\lambda'z. \quad (3)$$

The $\lambda_i$ are referred to as the kriging weights for the prediction of $z_0$. In accomplishing the prediction of $z_0$, UK meets two criteria. First, the prediction should be unbiased, which is expressed by requiring that the linear combination of the random variables $Z_i$ equals $Z_0$ on average:

$$O=E[\hat{Z}_o-Z_o]=E[\lambda'Z-Z_o]. \quad (4)$$

This expectation is taken over the joint [n+1]-variate distribution of $Z_0$ and $Z=(Z_1, Z_2, \ldots, Z_n)$. Linearity of expectation together with the trend assumption (1) implies:

$$0=E[\lambda'Z-Z_0]=\lambda'E[Z]-E[Z_0]=\lambda'(Y\beta)-y_0'\beta=(\lambda'Y-y_0')\beta=\beta'(Y'\lambda-y_0) \quad (5)$$

no matter what $\beta$ may be. This will be the case provided that the following holds:

$$Y'\lambda=y_o. \quad (6)$$

Among all the possible solutions of this underdetermined system of equations, UK selects $\lambda$ to minimize the variance of the prediction error $\hat{Z}_0-Z_0$. In this sense, UK is an unbiased linear predictor. In addition, because by virtue of (6) the prediction error is zero on average, the variance is simply the expectation of the squared prediction error:

$$\text{Var}(\hat{Z}_o-Z_o)=E[(\hat{Z}_o-Z_o)^2]=E[(\lambda'Z-Z_o)^2]=c_{oo}-2\lambda'c_o+\lambda'C\lambda' \quad (7)$$

where $c_0=(c_{01}, c_{02}, \ldots, c_{0n})'$ is the vector of covariances between $Z_0$ and the $Z_i$, $i \ge 1$, and $c_{00}$ is the variance of $Z_0$.

To minimize (7), one may simply differentiate with respect to $\lambda$ and introduce a vector of p Lagrange multipliers $\mu$ to incorporate the constraint (6). This yields a system of n+p linear equations, written in block-matrix form as:

$$\begin{pmatrix} C & Y \\ Y' & 0 \end{pmatrix} \begin{pmatrix} \lambda \\ \mu \end{pmatrix} = \begin{pmatrix} c_0 \\ y_0 \end{pmatrix}, \quad (8)$$

where 0 represents a p-by-p matrix of zeros. Writing 1 for the n-by-n identity matrix, the unique solution for $\lambda$ is given by:

$$\lambda=H'y_o+C^{-1}(1-YH)c_o. \quad (9)$$

This relationship presents the kriging weights λ as the sum of a term that depends only on the hat matrix and the covariates at the prediction location [H'y$_0$] plus a term that depends on the covariances among the data and the predict and, Z$_0$. Substituting (9) into the right hand side of (7) yields the kriging prediction variance, which can be used to construct prediction limits about $\hat{z}_0$.

In most applications, the UK trend includes at a minimum one term representing the overall mean. This term can be represented in Y as a constant column of non-zero values. As one example, if this constant is the only trend term included, the method is referred to as Ordinary Kriging (OK). However, the term trend (or drift) derives from applications in which the attributes $y_{ij}$ depend on the coordinates of the locations. For instance, for a two-dimensional (2D) data set the inclusion of a column of ones, a column of first coordinates (eastings), and a column of second coordinates (northings) fits a plane through the data. Although functions of the coordinates may be nonlinear, the model remains linear in its parameters β. When the random fluctuations around the trend are assumed to be mutually independent and homoscedastic (as implied by second-order stationarity), the method is referred to as Ordinary Least Squares (OLS) trend estimation or multiple regression, in which matrix C reduces to a multiple $\sigma^2$ of the n-by-n identity matrix and the vector $c_0$ is zero.

The flexibility of defining trends through the design matrix in the groundwater environment, Y, is apparent when its columns include other information. For example, these columns of the design matrix could represent the distance to a hydraulic boundary such as a river or pumped well. In this way, UK can incorporate location dependency in ways that extend beyond simple functions of the coordinates alone. This can increase the fidelity of UK to underlying physical laws and increase the accuracy of its predictions. For UK to be valid, it is necessary that the attributes in the design matrix be independent of the random variables Z, which model deviations from the trend.

In the hydrological sciences, UK is often used to map groundwater levels when there is reason to suspect a trend. For example, where unidirectional flow exists, the linear trend in the data coordinates described above is often suitable. To prepare groundwater level maps in the vicinity of pumped wells the UK trend incorporates point sink/source terms to describe the change in water level due to extraction and injection at wells, which are derived using the Cooper-Jacob equation that describes drawdown in response to pumping at a well. Often, groundwater level maps prepared in this manner are suitable for estimating the extent of hydraulic capture developed by extraction wells. In some instances, UK may further accommodate terms that describe the effect of linear, circular, irregularly shaped sinks and sources, and many other hydrologic features on groundwater levels.

At sites for which several data sets are available over time, UK can only be relied upon to prepare maps corresponding to each dataset (e.g., each event) in order to depict conditions over time. Such a "sequential" approach to mapping multiple events represents an alternative to creating a single map representing typical or average conditions. As one example, the "sequential" multi-event mapping approach is used to construct a water level map and estimate the extent of hydraulic containment (or capture zone), independently for each event. Then, a set of such maps is used to construct capture frequency map showing the proportion of events for which areas of the domain are hydraulically contained. However, this approach of "sequential" multi-event mapping processes each sample event separately from all other events, and thus results in a temporal partitioning of the data and their kriging before each event. Further, such approaches assume (1) that no relationship exists (or may be imposed) among the trend coefficients for different events; (2) sufficient data exists at each event to estimate the covariance functions and to make reliable and comparable predictions; and (3) residuals from the trend are uncorrelated between events.

However, in practice it is very often the case that certain trend coefficients are related between events. Additionally, variations in the data support (e.g., number and locations of sample data) between events, together with random variations inherent in the observation data, can result in the estimation of substantially different or contradictory trend coefficients for different events, when using this "sequential" approach to map multiple events, as is described in more detail below. Further, problems may arise since insufficient data for some events can substantially completely prevent the estimation of trend coefficients and therefore the preparation of maps for those events altogether, when using the "sequential" approach to mapping with traditional UK.

For example, if a trend term derived from the Cooper-Jacob equation is used to describe drawdown due to pumping in an aquifer, the extent to which this trend approximates the true response of groundwater levels to pumping, its use as a covariate introduces physical theory into the kriging prediction and so may increase the accuracy of the model. Further, because the pumping-effect calculation is based upon independent information about those pumping effects, such information can be introduced as covariates. For the Cooper-Jacob equation, the magnitude of the pumping effects for constant discharge rate, Q, at any time t and radial distance, R, is proportional to the reciprocal of the transmissivity, which implies that 1/T is a suitable function to use as a coefficient of the pumping-effects covariate. Because, in a confined aquifer, transmissivity remains constant over time, the true coefficient $\beta_j$ of a pumping covariate $y_j$ should be the same for each mapped event. However, when maps are prepared independently for each sample event using the "sequential" mapping approach, there is nothing to constrain the estimates $\hat{\beta}_j^{(k)}$ for the individual events (as indexed by k) to be the same for all k. In fact, in practice, the estimates surely vary among events, which leads to varying estimates of the constant T. Thus, while information about the trend is present in the observations obtained from each event, independent mapping of each event using the "sequential" mapping approach does not enable such information to be estimated consistently over time nor with the highest possible accuracy.

The inventors have recognized disadvantages in using the methods described above, and have thus developed novel technique of "simultaneous" multi-event universal kriging, termed MEUK. In particular, MEUK is advantageous since it incorporates (a) a single covariance function common to all events; (b) assumes that the random variables $Z_i^{(k)}$ for event k and $Z_j^{(l)}$ for event l≠k are uncorrelated; and (c) imposes functional relationships among some of the parameters (those defined by the analyst) with respect to time. In particular, assumption (b) holds when the times between sampling events are sufficiently long to assure practical independence of kriging residuals from one event to the next, which often is the case in a well-designed monitoring program. However, even when assumption (b) does not hold, ignoring temporal correlation still provides a very efficient approximation to a full space-time statistical model that accelerates and advances the kriging approach.

MEUK may be applied to any data in the form of equation (1) where the $z_i$ are partitioned into disjoint groups of $n^{(1)}$, $n^{(2)}, \ldots, n^{(m)}$ observations corresponding to a block decomposition of the vector $z'=(z^{(1)\prime}, z^{(2)\prime}, \ldots, z^{(m)\prime})$ into events. MEUK is minimum-variance unbiased linear prediction where the $z^{(k)}$ are assumed to be the realizations of random variables $Z^{(k)}$ for which:

$$\mathrm{Cov}(Z^{(k)}, Z^{(l)}) = 0 \text{ for } k \neq l \tag{10}$$

and otherwise is explicitly specified. In one instance, the prediction target may be a predict and $(y_{01}, y_{02}, \ldots, y_{0P}; z_0)'$ that is assumed to belong to a particular event $k_0$ in the sense that the covariance of $Z_0$ with $Z^{(l)}$ is zero for all $l \neq k_0$ and that covariance is known (usually as a function of the relative positions of the data).

In practice, MEUK may be applied by estimating a covariance function from the data as is done in UK. However, in contrast to UK, MEUK has the advantage that it can "borrow strength" in the statistical sense from the combined dataset for all events by assuming that the covariance function does not change between events. This has further advantages since it replaces the estimation of m event-specific covariance functions, each based on $n^{(k)}(n^{(k)}-1)/2$ pairs of data, by the estimation of a single covariance function based on the collection of all those data pairs, which substantially increases the precision with which the covariance function can be identified and estimated. This decreases the bias of acting, for the purposes of prediction, as if the covariance function were independently known when it had actually been estimated from the very same data.

With regard to computations using MEUK, which may be over implemented at sites where many observations are collected per event and/or many events such that thousands to millions of predictions are used, problems of this size are practicable since MEUK is able to use efficient matrix solving procedures adapted to its sparse block matrix structure.

To exploit this structure, consider an example form of functional constraints among the spatial trend parameters that is useful in common practice. Suppose there are p covariates per event. Without further constraints, allowing the parameters to vary among m events, there would exist pm parameters in the model and MEUK would reduce to applying UK separately to each event. However, for MEUK, the covariates are divided into two groups: those whose parameters differ between events (called local parameters) and those whose parameters remain constant over all events (called global parameters). The latter is a special form of linear constraint. The values of the global covariates, which may be properties of fixed points or data supports of fixed extent in space, may themselves still change from one event to another while the global parameters remain constant over time. This division of covariates into local and global is determined with substantially complete flexibility by the analyst by whether their parameters are allowed to change between events.

As described above, the covariates may be indexed by $i = 1, 2, \ldots, p$. Let the first q of these designate the local covariates and the last p−q designate global covariates. Then, for each local covariate, one column may be introduced into the design matrix Y for each event, but for each global covariate a single column appears in the design matrix to cover all events. When columns for local covariates are grouped by event and columns for global variates are grouped together, Y is seen to have a block structure:

$$Y = \begin{pmatrix} n^{(1)} \\ n^{(2)} \\ \vdots \\ n^{(m)} \end{pmatrix} \begin{pmatrix} \overset{q}{V^{(1)}} & \overset{q}{0} & \cdots & \overset{q}{0} & \overset{p-q}{W^{(1)}} \\ 0 & V^{(2)} & \cdots & 0 & W^{(2)} \\ \vdots & \vdots & \ddots & \vdots & \vdots \\ 0 & 0 & \cdots & V^{(m)} & W^{(m)} \end{pmatrix} \tag{11}$$

In equation (11), the numbers along the top row and left side give the block dimensions. The entries within (11), shown in bold, are either all zeros within a block (a matrix of dimensions $n^{(k)}$ by q) or are the values of the covariates, split by columns into the matrices $V^{(k)}$ (local to event k, with q columns each) and $W^{(k)}$ (global, with p−q columns). The dimensions of the design matrix Y are N by P where $N = n^{(1)} + n^{(2)} + \ldots + n^{(m)}$ is the total number of observations over all m events, and P = mq + p − q is the total number of parameters (reduced from the original pm parameters).

Because correlations in residuals between events are assumed zero, the covariance matrix C enjoys a comparable block decomposition:

$$C = \begin{pmatrix} n^{(1)} \\ n^{(2)} \\ \vdots \\ n^{(m)} \end{pmatrix} \begin{pmatrix} \overset{n^{(1)}}{C^{(1)}} & \overset{n^{(2)}}{0} & \cdots & \overset{n^{(m)}}{0} \\ 0 & C^{(2)} & \cdots & 0 \\ \vdots & \vdots & \ddots & \vdots \\ 0 & 0 & \cdots & C^{(m)} \end{pmatrix} \tag{12}$$

That is, it is block-diagonal with dimensions N by N. For monitoring at fixed stations with no missing data, $n^{(1)} = n^{(2)} = \ldots = n^{(m)} = n$ and the spatial configuration of the supports does not change, leading to the same n-by-n covariance matrix appearing m times along the diagonal of C. In reality, there are very few monitoring programs that do not exhibit missing or suspect data for one or more events. Thus, MEUK is designed to handle the general case, in which the spatial configuration of support more likely than not does indeed change.

Most of the work in obtaining the GLS estimates occurs in computing and inverting the P-by-P matrix $Y'C^{-1}Y$, however, since typically N≪P, a much smaller problem is encountered than in the prediction problem, which involves inverting an N+P by N+P matrix. In this way, prediction may be further expedited by exploiting the UK solutions for individual events (using local covariates), which involves inverting the much smaller $n^{(k)}+q$ by $n^{(k)}+q$ matrices. Thus, one may take these solutions and adjust them, relatively inexpensively, to create the MEUK solution. To this end, the rows and columns in the kriging equations (8) (using the block design matrix and block covariance matrix) may be re-arranged to make them look as much as possible like a block-diagonal matrix of kriging coefficients for the individual events:

$$\begin{pmatrix} C^{(1)} & V^{(1)} & \cdots & 0 & 0 & W^{(1)} \\ V^{(1)\prime} & 0 & \cdots & 0 & 0 & 0 \\ \vdots & \vdots & \ddots & \vdots & \vdots & \vdots \\ 0 & 0 & \cdots & C^{(m)} & V^{(m)} & W^{(m)} \\ 0 & 0 & \cdots & V^{(m)\prime} & 0 & 0 \\ W^{(1)\prime} & 0 & \cdots & W^{(m)\prime} & 0 & 0 \end{pmatrix} \begin{pmatrix} \lambda^{(1)} \\ \mu^{(1)} \\ \vdots \\ \lambda^{(m)} \\ \mu^{(m)} \\ \theta \end{pmatrix} = \begin{pmatrix} c_0^{(1)} \\ v_0 \\ \vdots \\ c_0^{(m)} \\ v_0 \\ w_0 \end{pmatrix} \tag{13}$$

In this MEUK matrix, the $C^{(k)}$ are the covariance matrices restricted to the observations within each event k; the $V^{(k)}$ are the local columns of the design matrices for the observations in event k; and the $W^{(k)}$ are the global columns of the design matrix, with rows partitioned by events. On the right hand side the $c_0^{(k)}$ are the covariances between the observations at event k and the predictand. When the predictand belongs to a single event l, $c_0^{(l)}$ may be nonzero but all $c_0^{(k)}$ for k≠l will be zero by definition (that is, they are vectors of $n^{(k)}$ zeros). The local attributes of the predictand appear in $v_0$, repeated in all m blocks, and the global attributes appear in $w_0$, appearing once at the bottom. (When the predictand belongs to more than one event, its local attributes may vary among events, in which case the appearances of $v_0$ must be replaced by the appropriate $v_0^{(k)}$.)

As shown by the lines, the system has a bordered diagonal block form with m+1 blocks of rows and columns:

$$\begin{pmatrix} \Sigma^{(1)} & \cdots & 0 & X^{(1)} \\ \vdots & \ddots & \vdots & \vdots \\ 0 & \cdots & \Sigma^{(m)} & X^{(m)} \\ X^{(1)\prime} & \cdots & X^{(m)\prime} & 0 \end{pmatrix} \begin{pmatrix} \rho^{(1)} \\ \vdots \\ \rho^{(m)} \\ \theta \end{pmatrix} = \begin{pmatrix} u^{(1)} \\ \vdots \\ u^{(m)} \\ w_0 \end{pmatrix} \quad (14)$$

where $$\Sigma^{(k)} = \begin{pmatrix} C^{(k)} & V^{(k)} \\ V^{(k)\prime} & 0 \end{pmatrix}, x^{(k)} = \begin{pmatrix} W_0^{(k)} \\ 0 \end{pmatrix}, u^{(k)} = \begin{pmatrix} c_0^{(k)} \\ v_0 \end{pmatrix}, \quad (15)$$

and $$\rho^{(k)} = \begin{pmatrix} \lambda^{(k)} \\ \mu^{(k)} \end{pmatrix}.$$

Block row-reduction of the augmented matrix yields the solution:

$$\theta = \left( \sum_{k=1}^{m} X^{(k)\prime}(\Sigma^{(k)})^{-1} X^{(k)} \right)^{-1} \left( -w_0 + \sum_{k=1}^{m} x^{(k)\prime}(\Sigma^{(k)})^{-1} u^{(k)} \right), \quad (16)$$

$$\begin{pmatrix} \lambda^{(k)} \\ \mu^{(k)} \end{pmatrix} = \rho^{(k)} = (\Sigma^{(k)})^{-1} u^{(k)} - (\Sigma^{(k)})^{-1} X^{(k)}\theta, k = 1, 2, \ldots, m.$$

This exhibits the MEUK weights $\lambda = (\ddot{e}^{(1)}, \ddot{e}^{(2)}, \ldots, \ddot{e}^{(m)})$ as comprised of the UK weights for the individual events using the local covariates, $(\Sigma^{(k)})^{-1} u^{(k)}$, as modified by an additive adjustment that depends on the global covariates.

Matrix inversion to compute θ involves a p–q by p–q matrix $$\sum_{k=1}^{m} X^{(k)\prime}(\Sigma^{(k)})^{-1} X^{(k)}.$$

The effort in computing the inverse of $\tau^{(k)}$ is substantially the same as that of solving the kriging system for the event k. Corresponding to each prediction point are its local attributes $v_0$, its global attributes $w_0$, and the series of values to be estimated for its support at events k=1, 2, . . . , m. In looping over the events k, two local solutions may be computed per event:

$$(\Sigma^{(k)})^{-1} u^{(k)}$$

for $$u^{(k)} = \begin{pmatrix} c_0^{(k)} \\ v_0 \end{pmatrix}$$

and for $$u^{(k)} = \begin{pmatrix} 0 \\ v_0 \end{pmatrix} = \tilde{u}^{(k)}.$$

In some instances, these can be obtained efficiently and simultaneously along with intermediate terms in the form:

$$\left( (\Sigma^{(k)})^{-1} u^{(k)} \mid (\Sigma^{(k)})^{-1} \tilde{u}^{(k)} \mid (\Sigma^{(k)})^{-1} X^{(k)} \right) = (\Sigma^{(k)})^{-1} \begin{pmatrix} c_0^{(k)} & 0 & W^{(k)} \\ v_0 & v_0 & 0 \end{pmatrix}, \quad (17)$$

whose computation time is proportional to the number of columns in the augmented matrix $$\begin{pmatrix} C^{(k)} & V^{(k)} & c_0^{(k)} & 0 & W^{(k)} \\ V^{(k)\prime} & 0 & v_0 & v_0 & 0 \end{pmatrix}.$$

In this matrix, the columns occur in blocks of $n^{(k)}$, q, 1, 1, and p–q. When all events have substantially more observations than global parameters to be estimated this is only $(n^{(k)}+p+2)/(n^{(k)}+q+1) \approx 1$ times as great as obtaining either local solution by itself. Consequently, the computational effort to prepare maps for all the events with MEUK is approximately the same as that to map all individual events by themselves via UK, which presents a substantial savings in time.

Two cases are now described to illustrate various differences between results obtained using MEUK and UK methods. In each case, water level data obtained from an aquifer are used to estimate trend coefficients and prepare maps depicting groundwater flow patterns by each method. For simplicity, FIGS. 6-8D depict example water level data obtained from a hypothetical aquifer having a linear hydraulic gradient while FIGS. 9-11D show the example water level data of FIGS. 6-8D obtained from the some hypthetical aquifer having a linear hydraulic gradient further including extraction/injection wells.

Figure 6:
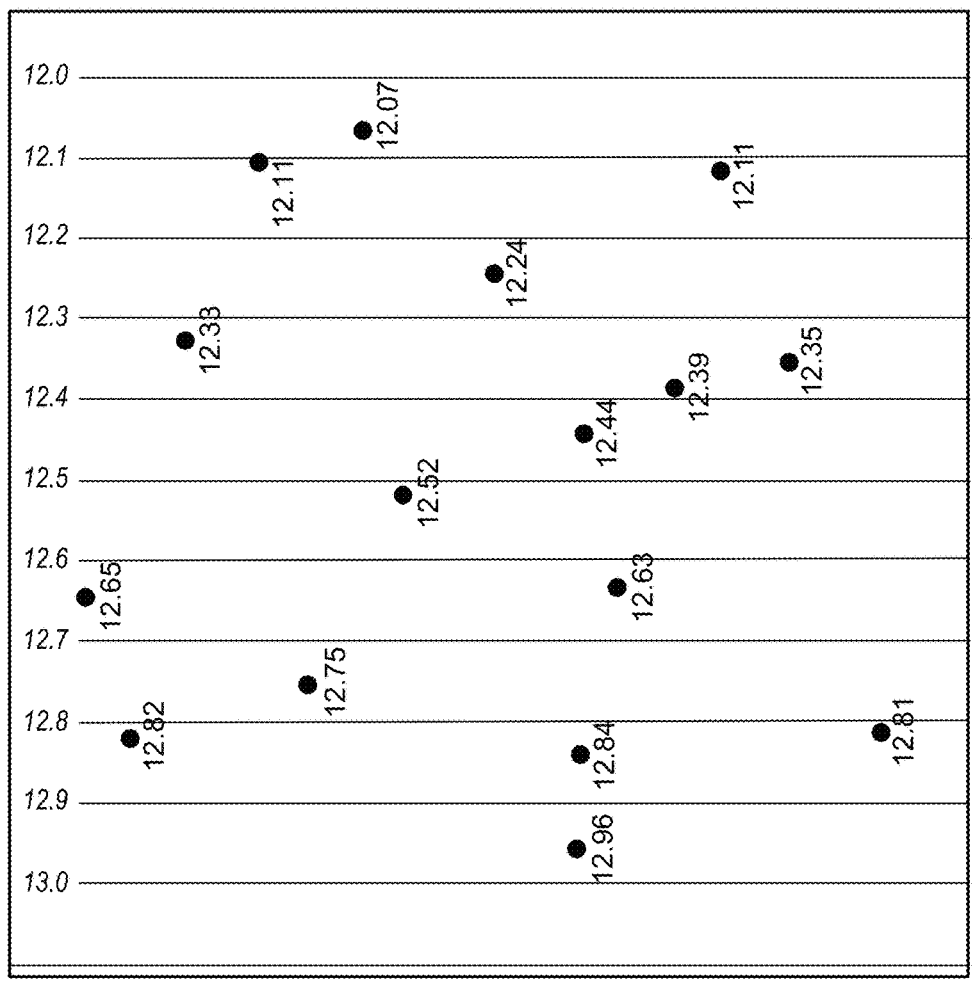
FIGS. 6-8D show example water level data obtained from a simplified aquifer having a linear hydraulic gradient to illustrate differences between the MEUK and UK methods.
Figure 7A:
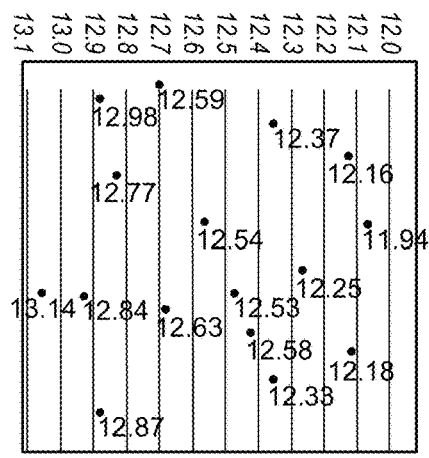
Figure 7B:
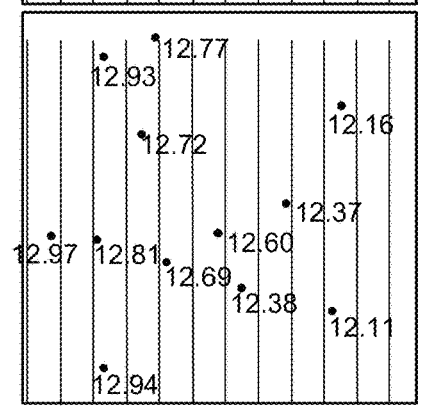
Figure 7C:
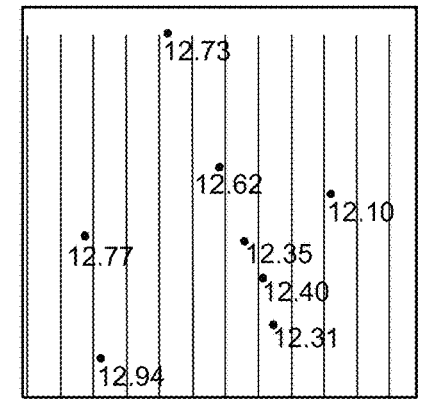
Figure 7D:
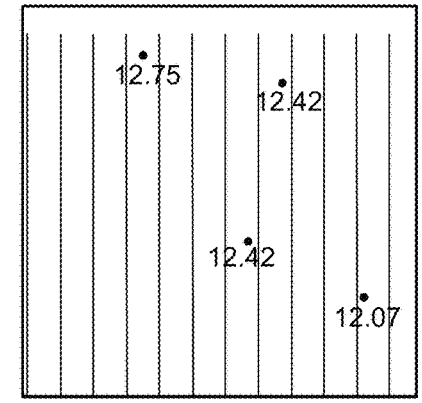
Figure 8A:
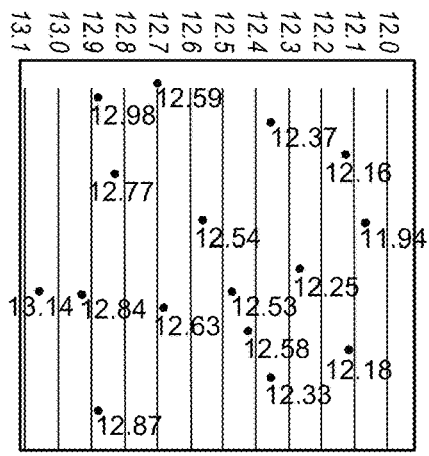
Figure 8B:
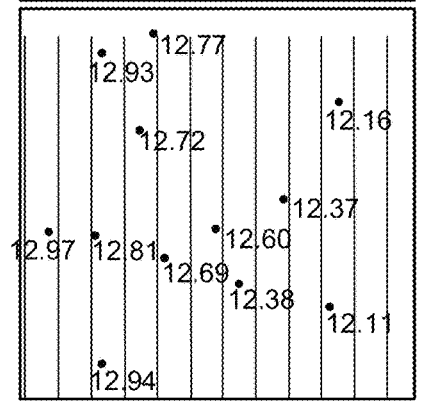
Figure 8C:
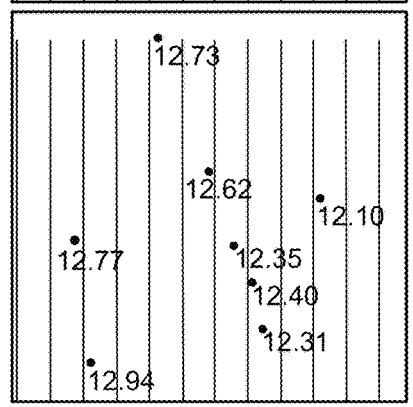
Figure 8D:
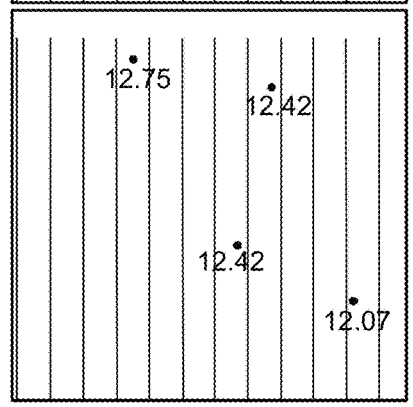

FIG. 6 shows surface 600 that is a first case wherein a hydraulic gradient depicts a spatial trend that aligns with the horizontal x-axis along with water levels at 16 data points. To simulate four separate data events, four subsets of the 16 water levels (that are herein assumed to be true and accurate water levels) are further used as data for kriging: subset A includes all 16 data points, subset B includes 12 of the 16 data points selected at random, subset C includes 8 of the data points, and subset D includes 4 data points. Trend coefficients are then estimated using the various data points by incorporating a linear spatial trend along the x-axis and implementing (a) UK separately for each event (e.g., sequential multi-event UK) (FIGS. 7A-D) and (b) MEUK for all events simultaneously (e.g., simultaneously multi-event MEUK) (FIGS. 8A-D), wherein the latter assumes that the slope is a global variable whereas the intercept is a local variable. Due to the simplicity of the example, the estimated trend coefficients are quite accurate by both UK and MEUK, since the simple form of the trend and data are accurately known. Therefore, water level contours are not calculated or shown. The true coefficients of the spatial trend, that is, the slope (−1.12 e-04) and intercept (+1.51e+01) of the hydraulic gradient, are known but are also predicted accurately by each method, although the average error is larger for UK than MEUK. This is the trivial case.

To simulate a more commonly encountered case wherein measurements are accompanied by some errors or variance, FIGS. 7 A-D show similar plots with Gaussian (random) noise ($\mu$=0.0, $\sigma$=0.1) added to the water levels for each of the four event datasets, one of which is shown in FIG. 6. As above, trend coefficients are estimated from these noisy data using UK separately for each event and MEUK for all events simultaneously. As illustrated herein, the presence of data noise produces substantially different estimates for the trend coefficients (a) between events when using UK, and (b) between UK and MEUK. Since the coefficient estimates differ, water level contours are calculated and shown in FIGS. 7 A-D and FIGS. 8 A-D, which plot the noisy data for each event together with the GLS trend contours obtained from UK and MEUK, respectively. Table 1 further shows the percent difference between the true slope and intercept and the estimates obtained from the noisy data via UK and MEUK.

TABLE 1

Comparison of UK and MEUK trend coefficients for case 1.

| | | | % Difference | |
|---|---|---|---|---|
| FIG. | X gradient | Intercept | X gradient | Intercept |
| True | −1.12e−04 | 15.1 | — | — |
| 7A | −1.23e04 | 15.4 | 9.8 | 2.0 |
| 7B | −1.09e−04 | 15.1 | −2.8 | −0.1 |
| 7C | −1.37e−04 | 15.7 | 22.8 | 3.9 |
| 7D | −1.03e−04 | 14.9 | −7.7 | −1.4 |
| 8A | −1.18e−04 | 15.3 | 5.2 | 1.2 |
| 8B | | 15.3 | 5.2 | 1.3 |
| 8C | | 15.3 | 5.2 | 0.9 |
| 8D | | 15.3 | 5.2 | 0.9 |

As shown in Table 1, the UK GLS solutions show considerable variability between events: this is to be expected and results from the "noisy" measurement data. However, the UK estimates also differ more substantially from the known true coefficients than does the MEUK GLS solution. For example, the UK slope estimate differs from the true slope by between −7.7% and 22.8% and the intercept estimate differs from the true intercept by between 1.4% and 3.9%. Conversely, the MEUK slope estimate is, by design, the same for all events and differs from the true slope by 5.2% while the intercept, which is allowed to vary for each event, differs from the true intercept by between 0.9% and 1.3%. Thus, this simple example illustrates how each additional event can increase the accuracy of all simultaneous MEUK predictions, whereas additional events cannot increase the accuracy of individual sequential event UK predictions.

FIGS. 9-11D shows a second case that including the linear hydraulic gradient of FIGS. 6-8D but further including extraction/injection wells. Thus, this example superimposes an extraction well and an injection well, having equal but opposite rates, on the uniform gradient described above with respect to FIGS. 6-8D. Although the transmissivity is assumed constant for all events, event- and well-specific extraction and injection rates are included, that result in event- and well-specific drawdown and mounding of the groundwater levels.

Figure 9:
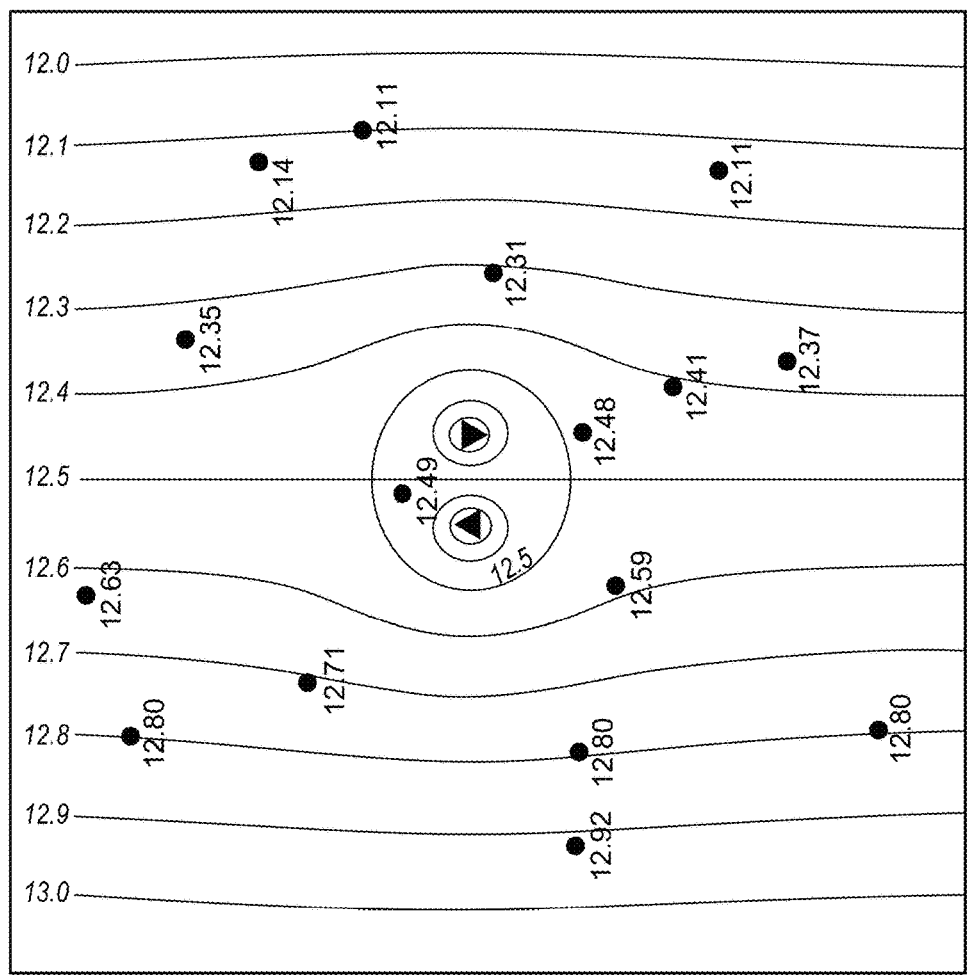
FIGS. 9-11D show example water level data obtained from the aquifer of FIGS. 6-8D having a linear hydraulic gradient and extraction/injection wells to further illustrate the method according to the present disclosure.
Figure 10A:
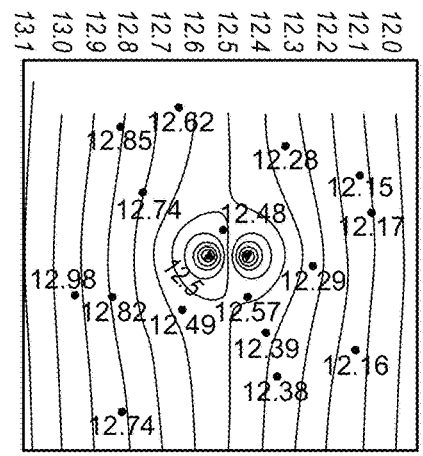
Figure 10B:
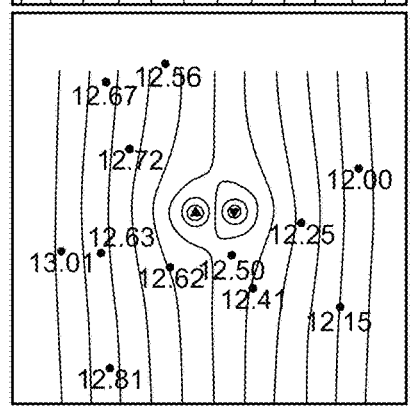
Figure 10C:
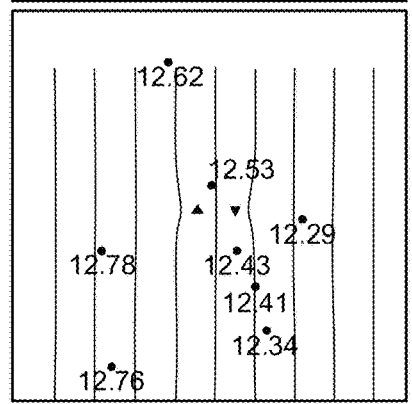
Figure 10D:
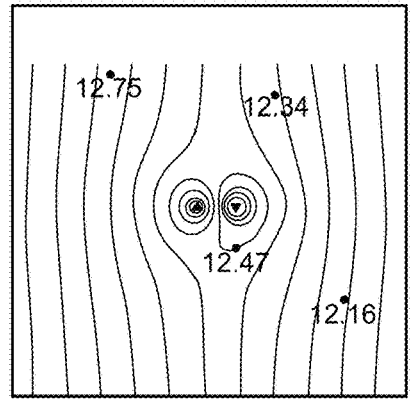
Figure 11A:
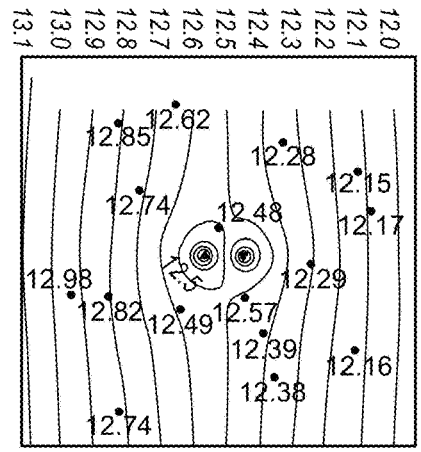
Figure 11B:
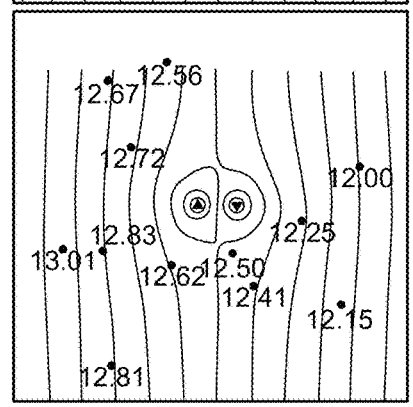
Figure 11C:
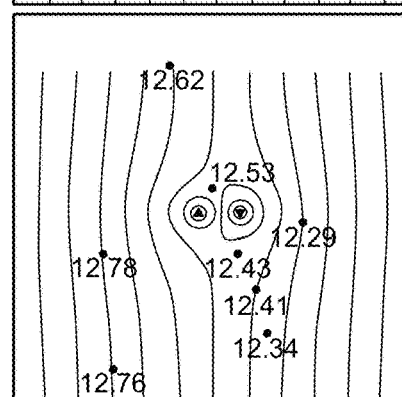
Figure 11D:
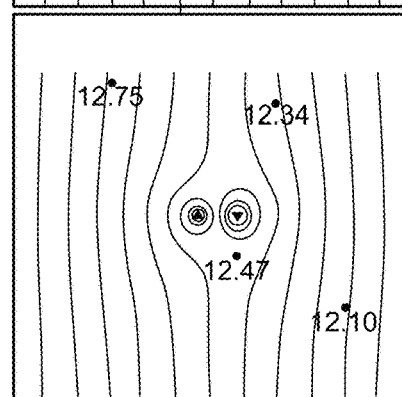

FIG. 9 illustrates surface 900 that is one of the true surfaces, which can be reproduced from "noiseless" data. As above, four subsets of the 16 true water level values were selected at random as data for kriging (subset A—16 data points; subset B—12 data points; subset C—8 data points; subset D—4 data points). Furthermore, Gaussian noise ($\mu$=0.0, $\sigma$=0.05) was added to these values to mimic random measurement error. Then, trend coefficients were estimated from the noisy data using UK separately for each event and MEUK simultaneously for all events. As described above, the presence of noise in the data produces differing estimates for the trend coefficients between events for UK, and between UK and MEUK. Since the coefficient estimates differ, water level contours are calculated and are depicted in FIGS. 10 A-D and 11 A-D, which plot the noisy data for each event together with the GLS trend contours obtained from UK and MEUK, respectively. The computed UK and MEUK trend surfaces do not pass precisely through the data due to the applied noise, and the estimated coefficients do differ from the true coefficients. Table 2 shows that the UK GLS solutions have considerable variability between events. The UK trend coefficients differ greatly from the true trend coefficients in most cases, while the MEUK trend coefficients are both consistent and more accurate.

TABLE 2

Comparison of UK and MEUK trend coefficients for case 2.

| | | | | % Difference | | |
|---|---|---|---|---|---|---|
| FIG. | X | Well term | Intercept | X gradient | Well | Intercept |
| True | −1.12e−04 | −1.59e−05 | 15.1 | — | — | — |
| 10A | −1.19e−04 | −2.57e−05 | 15.3 | 6.5 | 61.4 | 1.2 |
| 10B | −1.26e−04 | −1.58e−05 | 15.5 | 12.9 | −1.0 | 2.2 |
| 10C | −9.37e−05 | 1.28e−06 | 14.7 | −16.3 | −108.0 | −2.9 |
| 10D | −1.15e−04 | −2.54e−05 | 15.2 | 3.2 | 59.2 | 0.3 |
| 11A | −1.17e−04 | −1.65e−05 | 15.3 | 4.9 | 3.3 | 0.9 |
| 11B | | | 15.3 | 4.9 | 3.3 | 0.9 |
| 11C | | | 15.3 | 4.9 | 3.3 | 0.7 |
| 11D | | | 15.3 | 4.9 | 3.3 | 0.7 |

For example, the poor performance of UK in the second case stems largely from the high leverage of points close to the extraction and injection wells, which greatly influence trend coefficient estimates, but that may vary greatly between locations and events. An advantage of both UK and MEUK prediction versus GLS estimation is that the results may be readily observed in maps. For example, FIG. 10C using UK shows very little impact from extraction and injection, whereas FIG. 11C using MEUK predicts the cones of depression and impression that are expected based on this example scenario. In this way, the simultaneous spatio-temporal nature of MEUK produces advantages over UK, which is susceptible to incorrect predictions based on its reliance on processing data from each event sequentially. Moreover, as a result of small errors in high-leverage points, both the UK GLS trend coefficients and the UK contour maps incorrectly suggest that the transmissivity changes between events. Furthermore, in severe cases of poor and highly variable data, the UK GLS even incorrectly reverses the sign of trend coefficients between events, which erroneously leads to predictions of mounding at extraction wells and drawdown at injection wells. This instability in the representation of pumping effects in the presence of noisy data or variable data further motivated the development of MEUK which borrows strength from multiple events and thereby reduces the leverage of individual, event-specific potentially noisy data points.

If the transmissivity were to have changed substantially between events, such information could be advantageously accommodated through MEUK in a number of ways. For instance, this could be accommodated by grouping events that exhibit similar transmissivities, or by introducing a new global time-varying covariate with parameters to be determined. In either instance, the mechanics of the application of MEUK remains unchanged. Furthermore, since the fundamental advance made by MEUK versus UK lies within the flexibility of the underlying GLS model and the simultaneous multievent capability therein facilitated, rather than in the geostatistics used for prediction, difference comparisons of the two multiple regression GLS models are emphasized herein.

Further, to illustrate the methods, FIGS. 12A-D and 13A-D illustrate example field site contoured UK predictions and MEUK predictions, respectively. Therein, actual data obtained from a field site are shown to illustrate a common consequence that may result from water level monitoring network that expands in time, which may include varying data collected between monitoring events, and interpretations of historical contaminant transport. In the example shown, water level data were obtained over several years from a thick unconfined aquifer that exhibits a substantially constant transmissivity. Further, independent information from the United States Geological Survey suggests that the distribution and influence of regional boundaries on local groundwater flow patterns have remained substantially constant, although rates of discharge from two nearby stormwater retention and discharge features have periodically varied in response to rainfall-runoff events. In addition, over time, the monitoring network expanded from four closely spaced wells to over 30 wells distributed throughout the site. As such, early in the life of the site, water level maps constructed using data obtained from a small group of wells suggested highly variable directions of groundwater flow and, by inference, directions of contaminant transport. However, over time, the expanding monitoring network presented increasingly consistent depictions of groundwater levels and contours. Even so, on occasions when a subset of wells was measured, such as opportunistic water level acquisition during a targeted water quality sampling events, groundwater elevation contours varied greatly.

For this reason, and to further exemplify the advantages of MEUK over UK, the water level data set is herein re-evaluated using each method. As noted already, estimation included using the UK and MEUK GLS regressions to obtain coefficients for defined terms, whereas prediction included solving the UK and MEUK equations to predict water levels at intermediate locations to produce grids suitable for contouring. Results obtained by applying UK and MEUK to four of the 20 available events (herein labeled A, B, C, and D) are shown in FIGS. 12 A-D and 13 A-D, respectively. The data sets shown illustrate how data obtained and the spatial coverage of samples may vary widely between events. In particular, events A and C include a small number of clustered observations while events B and D exhibit site-wide coverage.

FIGS. 12 A-D further demonstrates that applying UK along with a planar spatial trend for events having a small number of observations (e.g., events A and C) produces water level maps that contrast established patterns of regional flow. For example, water level maps may deviate by 65° from results obtained when site-wide coverage is available (e.g., events B and D). In this way, maps obtained using UK for events A and C may either be discarded based on independent information, or if retained may lead to erroneous interpretations regarding the likely migration of contamination. Thereby, a disadvantage of UK results since maps may only be retained for events having site-wide coverage.

Conversely, FIGS. 13 A-D demonstrates that application of MEUK, which assumes a global planar trend, produces consistent water level maps having substantially the same pattern over time, even when few data are available (e.g., events A and C). As such, for events with site-wide coverage (e.g., events B and D), minor differences between maps are obtained via UK and MEUK. However, MEUK relinquishes little flexibility in interpolation at times where data are sufficient while providing more consistent interpolation when data are sparse.

In this way, MEUK offers a more satisfying solution by mapping all events together, regardless of event-specific data, into a single system of equations. MEUK also exploits correlations among residuals from its fitted trend, thereby improving its predictions at all events. MEUK also applies trend information obtained reliably at some events to make predictions over all events, which provides an enhanced and more accurate picture of the system through time.

Inconsistent data support is a common feature of multi-event data sets. For example, differing spatial coverage between events may result from opportunistic data acquisition, equipment failure, varying sampling plan requirements, and/or budgetary limitations. In fact, development of MEUK was motivated in part by a desire to produce accurate and consistent maps using multi-event data sets that display global characteristics that are expected to be fairly constant over time, while also allowing for variability between events using local trend components, and variograms that represent deviations from the sum of global and local trends. Changing a global term to a local term allows for separate estimates at each event, at a cost of introducing additional parameters: standard model comparison criteria, such as AIC or BIC, could then be used to assess the significance of the new parameters. Furthermore, the appropriateness of the assumption of constancy for global trend components may be tested statistically by nesting a model having a local term within a model having a global term for the same variable.

In this way, application of MEUK is a decision to split the analysis of temporal and spatial variability into deterministic and random components. Rarely is this division revealed by data a priori; but rather, is based on physical theory and experience. In allowing for deterministic trends that have some time invariant global parameters, MEUK facilitates the incorporation of independent information across multiple time-sequenced data sets in physically appropriate ways.

A particular advantage of MEUK over more complex space-time kriging methods is that a full space-time covariance function need not be estimated, which simplifies computations. Although using separate covariance functions for separate events is possible using MEUK, doing so undermines the opportunity to borrow strength when estimating the covariance from a series of related data, and also suggests that the assumption of some global trends may be erroneous. Even when interpolated values vary substantially over time, if this variation is adequately captured by the underlying trends, then one may reasonably suppose that the residuals for each event have a common covariance structure. Thus, this asserts that (a) the typical sizes of the residuals are about the same (referred to as temporal homoscedasticity) and (b) the spatial autocorrelation should remain fairly stable over time. Such assumptions are reasonable, scientifically succinct, and can actually be tested as part of the MEUK GLS analysis.

As described herein, the overarching objective when applying MEUK is the preparation of accurate and informative maps, and not estimation of trend coefficients. However, the underlying GLS regression provides information not available from other mapping techniques, that is, information that can help ensure the maps are consistent with physical principles that are responsible for much of the spatio-temporal data correlation. In this way, the applications presented assume consistency of trends across all events. However, further grouping of similar events together can identify and depict systematic variations over time. For example, high water level events can be grouped to capture gradient changes that result from interception of groundwater with surface water, by including a trend term describing the effect of surface water on groundwater level.

Because MEUK is designed to handle the general case wherein the spatial configuration of support may change between events, MEUK can be further used to develop a wheel-and-axle monitoring strategy. For example, in the wheel-and-axle monitoring strategy, a core group of stations is monitored frequently to track the evolution of conditions over time, while a larger group of stations is measured synoptically at longer intervals to create periodic snapshots of the substantially complete spatial distribution of conditions. When applied in this format, MEUK can be used to estimate and apply trends identified from the full set of stations forming the wheel, to the events where the core stations forming the axle are observed. As demonstrated above, the potential for such applications is apparent from both synthetic and field applications.

The example applications presented herein illustrate various benefits of "simultaneous" MEUK versus event-specific sequential application of UK. As one example, the ability of MEUK to borrow strength from events possessing large data sets to map events possessing small data sets provides a natural tool for long-term monitoring (LTM) optimization.

Figure 14:
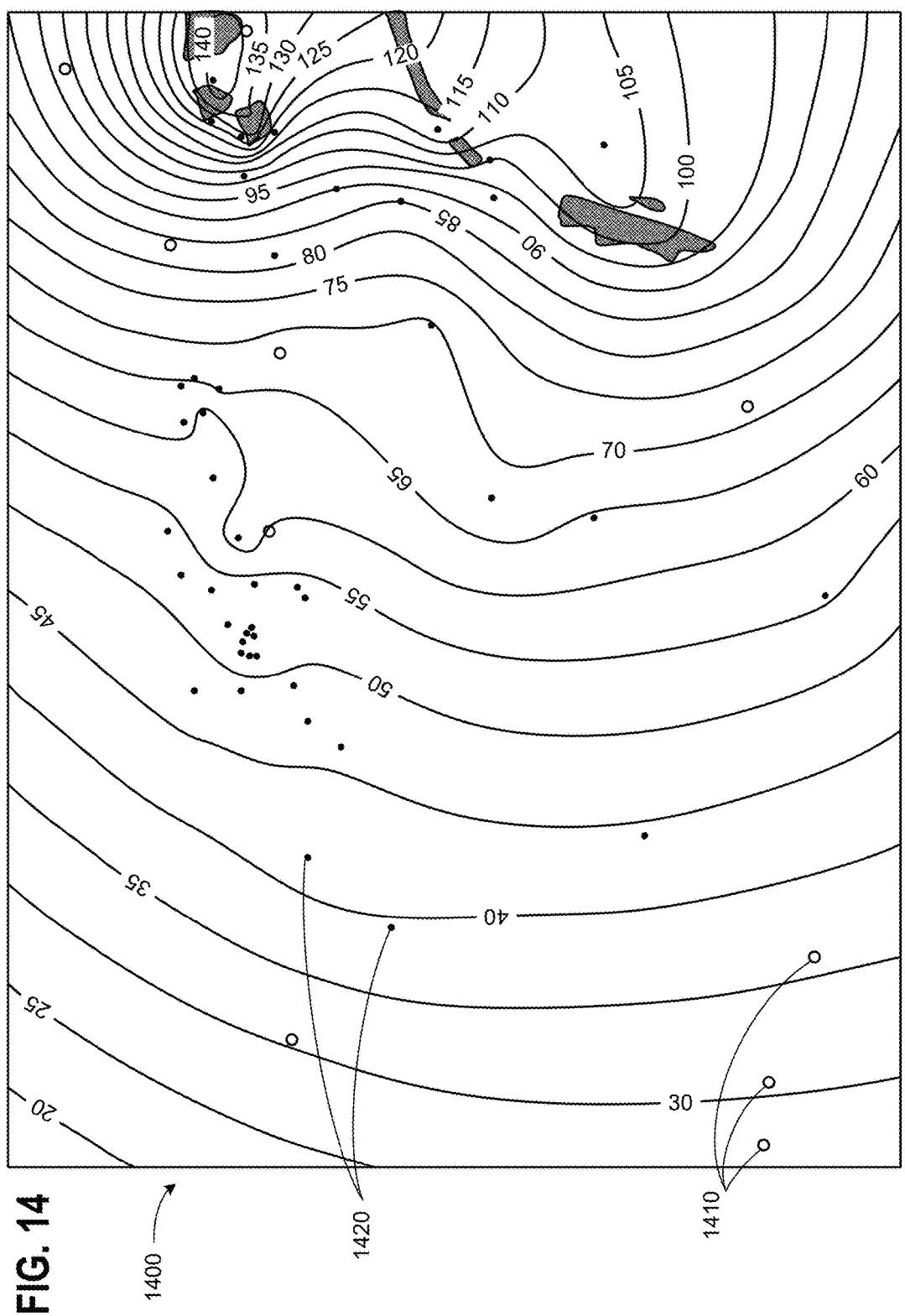
FIG. 14 shows an example mapped water level contour map.
Figure 15:
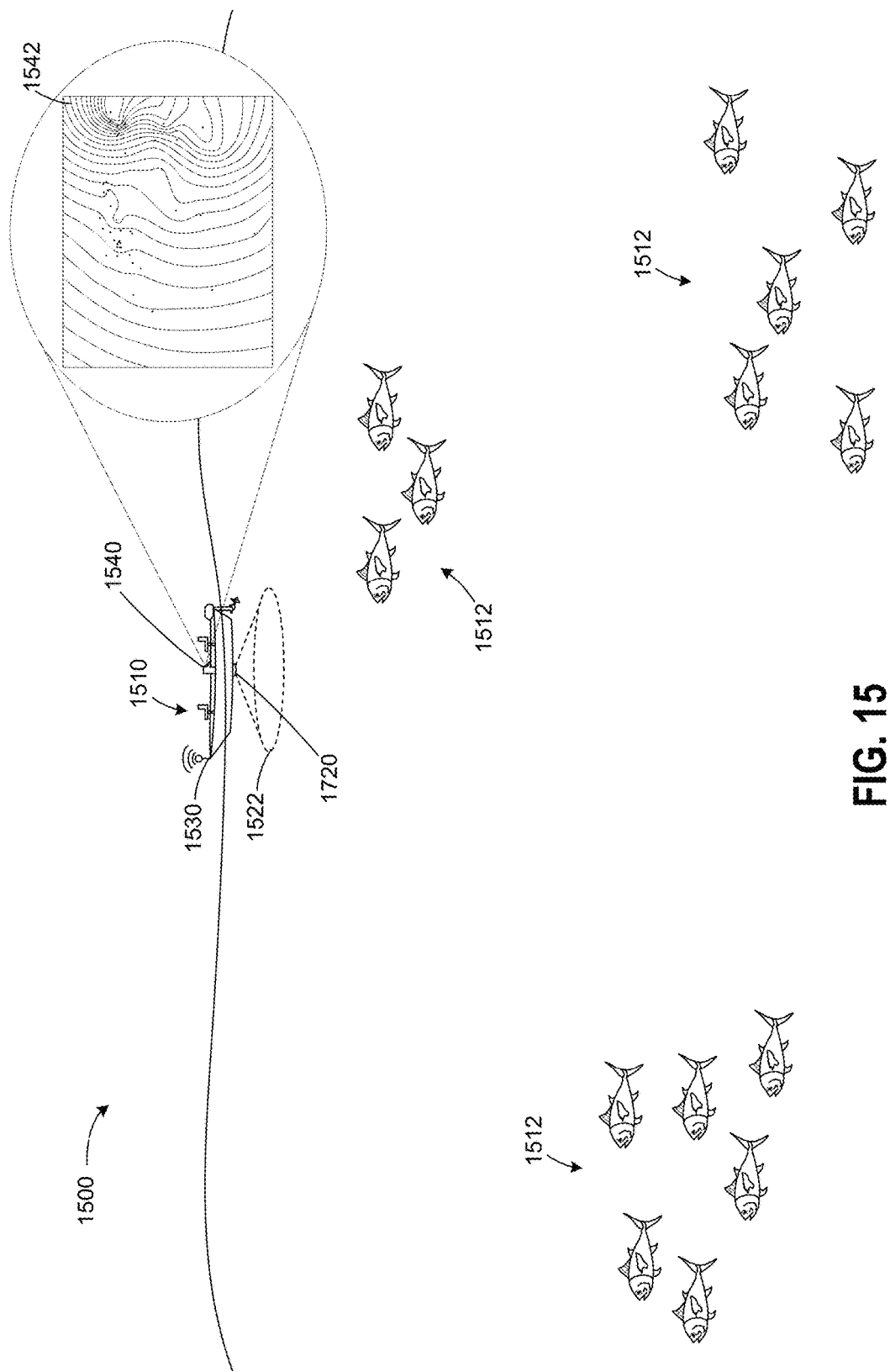
FIG. 15 illustrates a second geospatial application according to a second embodiment of the present disclosure.

With respect to the geospatial maps produced, FIGS. 14 and 15 show example mapped water level contours and particle traces across time-sequential water level maps.

FIG. 14 shows an example water level contour map 1400 produced according to the present disclosure. As noted already, the MEUK approach described may be used to generate time-dependent capture zones for wells and wellfields, by for instance, monitoring a water pressure associated with pumping well 1410 or monitoring well 1420. Such data may be used to produce a contour map for the managed aquifer system, which is shown with example MAR ponds. Thus, maps depicting approximate water levels (indicated by the labeled contour lines) and capture zones for each monitoring event may be automatically produced; however, discerning a 'best-estimate' of capture on the basis of more than, e.g., 100 individual maps, can be a difficult task by known methods. To remedy this, the methods described produce a single map that depicts the capture zone calculated from multiple monitoring events. When calculating a capture zone, particle tracking is independently conducted on each mapped surface until a path for each particle is determined. The calculated capture frequency is not a capture efficiency based on a transient ground water model, however, applications of the method to field data suggest that capture frequency maps (CFMs) empirically reflect the transient development of hydraulic capture. The map shown in FIG. 14 illustrates an example capture zone map.

Because in MEUK conditioning of the drift terms can be accomplished across all, or a defined subset, of the data mapping events. It enables cross-validation across a time-series of events to arrive at a best-fit of the underlying MEUK GLS using a universal set of kriging parameters rather than a separate set of kriging parameters for each event. Thus, presumably constant-in-time variables such as aquifer transmissivity can be inferred simultaneously from the entire multi-event data set. MEUK utilizes the construction of a single, block-diagonal, kriging matrix to accomplish interpolation events in a single exercise. Additional outputs of the simultaneous MEUK approach may include the evaluation of a kriging drift term.

FIG. 15 schematically illustrates a geospatial area according to a second embodiment of the present disclosure that illustrates how the simultaneous MEUK method may be used to create a map that indicates where populations of tuna fish are likely to reside. For instance, the methods may advantageously incorporate system-wide information to more accurately predict where fish populations reside within a geospatial area that is a body of water, e.g., water feature 1500.

For example, it is well established in the marine fisheries industry that ocean-going fish tend to accumulate in groups of fairly high density, particularly in the presence of oceanic flotsam/jetsam. As a result of this schooling pattern, the chances of obtaining representative samples of fish or fish density during large-scale sampling events is low—there is a tendency to miss these dense areas, unless their location is known. This schooling pattern has been advantageously used by fisheries who wish to recover the fish for profit, by depositing customized fish aggregation devices in the ocean. In doing so, fish that are targeted by the fishery school around the aggregation device, and can be efficiently caught by targeting the high-density aggregation areas. These circumstances combine to threaten understanding and sustainability of fish populations, because (a) population estimates are prone to large error where natural or anthropogenic aggregation features are not properly accounted for, and (b) anthropogenic aggregation devices concentrate fish and efficiently accelerate depletion of fish stocks from a poorly-constrained population.

Studies of fish aggregation devices and associated fish schooling patterns have identified some systematic patterns to the schooling behavior of the fish. During the 1990's, geostatistical techniques became increasingly popular as tools to map and estimate the population of fish communities. However, as with the mapping of groundwater data, much of the analysis has relied on stationarity assumptions or methods of data transforms to cope with the non-stationary (e.g., trend and pattern) aggregation of fish. Methods such as co-kriging have been particularly attractive, although these still tend to rest upon stochastic-theory descriptors of spatial covariance (rather than trends). However, mapping of fish distributions, and consequently the population of fisheries in certain areas, may be enhanced through the use of simultaneous MEUK if the mathematical functions that approximate the form (e.g., shape, pattern) of the fish schools around aggregation devices were included in an MEUK procedure. In doing so, both the regions of concentrated fish population (around such devices) and regions of lower-density more distributed population away from such devices would be accommodated in estimates of regional and local-scale fish population. This may result in enhance estimates of fish stocks, and improve management of fisheries for longer-term sustainable beneficiation.

As one example, watercraft 1510, which is shown as a simple fishing boat, may be a vessel in search of tuna populations 1512 for business purposes within water feature 1500 that is, for example, an ocean, lake, or sea. As shown, watercraft 1510 may include one or more sensors for sending out an electromagnetic signal 1522 (e.g., a sonar signal) that can be used to search locally in the vicinity of the vessel while communications beacon 1530 receives GIS information relating to the extended system where tuna populations are sought. For example, communication beacon 1530 may be configured to download information available from an internet source like, for example, FishWatch at the NOAA website. When arranged in this way, apparatus 1540, which in one implementation is a GPS-based computational apparatus found on-board watercraft 1510, may be configured to perform MEUK in the manner described above while compiling the data received from the data-collection stations (e.g., sensors) to form the spatio-temporal data set in order to map where the fish populations are likely to be found in real-time. Then, based on the descriptions above, apparatus 1540 may produce geospatial map 1542 that indicates where the tuna fish populations are likely to be found. In response to viewing geospatial map 1542, the vessel operator may set a course that is followed by the vessel to navigate to a suitable location that increases exposure of the fishing vessel to the tuna populations, which thereby has the potential to increase the operational efficiency of the vessel since more fish may be caught in a shorter period of time due to the increased exposure.

Although the system described is shown with apparatus 1540 included on-board the vessel, in another embodiment, the geospatial map may be produced at a location that is different from the vessel, but sent to the vessel via communication beacon 1530. In yet another embodiment, the geospatial map may be produced and printed on shore and carried on-board the vessel while the vessel is docked in port. Moreover, although the second embodiment is described in terms of identifying the locations of tuna fish populations, in other examples, the system may identify the likely locations of other animal species, e.g., crab populations or in still other examples may indicate fluidic-currents within water feature 1500 in order to make predictions related to the sensor data collected (e.g., to indicate future weather patterns).

It will be understood that the example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. A method executable by a computing device configured to process hydrometeorological data, comprising:
   receiving a first data set from a first set of hydrometeorological sensors located at a first set of locations;
   receiving a second data set from a second set of hydrometeorological sensors located at a second set of locations, wherein the second set of locations includes at least one location not included in the first set of locations, and wherein the first data set and the second data set further comprise a series of spatio-temporal data sets; and
   processing the series of spatio-temporal data sets received along with one or more trends associated with a geospatial area including the first set of locations and the second set of locations using a simultaneous multi-event universal kriging method that is configured to:
      estimate one or more trend coefficients based at least in part on the series of spatio-temporal data sets, the trend coefficients for different points in time estimated for all points in time simultaneously;
      predict interpolated data points at locations intermediate to data points within the series of spatio-temporal data sets based at least in part on the trend coefficients, interpolation weights for all points in time computed by solving a single system of equations based on the spatio-temporal data from all points in time;
      produce grids of data suitable for contouring based at least in part on the processed hydrometeorological data and interpolated data points; and
      construct a geospatial map supported by the series of spatio-temporal data sets and contouring representing the geospatial area including the first set of locations and the second set of locations.

2. The method of claim 1, further including associating a linear trend with the geospatial area that depends on location coordinates of the geospatial area.

3. The method of claim 1, wherein the one or more trend coefficients estimated further comprises a first set of variable trend coefficients and a second set of constant trend coefficients.

4. The method of claim 1, wherein the hydrometeorological data is applied for analyzing a groundwater level.

5. The method of claim 4, wherein the hydrometeorological data includes at least one of a groundwater pressure, a pumping flow-rate, and a water level.

6. The method of claim 5, wherein the geospatial map constructed is a water level map that estimates an extent of hydraulic containment in a capture zone.

7. The method of claim 5, wherein the hydrometeorological data further includes a field-based observation.

8. The method of claim 1, wherein the first set of locations and the second set of locations overlap in at least one location.

9. A computing system configured with executable instructions to process hydrometeorological data using one or more hydrological sensors, including:
   a processing unit for receiving a first data set from a first set of hydrological sensors located at a first set of locations and a second data set from a second set of hydrological sensors located at a second set of locations, wherein the second set of locations includes at least one location not included in the first set of locations, wherein the first data set and the second data set comprise two or more spatio-temporal data sets;

a memory unit for storing a trend associated with a geospatial area associated with the one or more hydrological sensors and including the first set of locations and the second set of locations, and executable code configured to execute a simultaneous multi-event universal kriging method with instructions for:

estimating one or more trend coefficients based on the received spatio-temporal data sets, the trend coefficients for different points in time estimated for all points in time simultaneously;

predicting interpolated data points at locations intermediate to data points within the received spatio-temporal data sets based at least in part on the trend coefficients, interpolation weights for all points in time computed by solving a single system of equations based on the spatio-temporal data from all points in time;

producing grids of data suitable for contouring based at least in part on the spatio-temporal data sets and interpolated data points; and constructing a geospatial map based on the spatio-temporal data sets and contouring associated with the geospatial area including the first set of locations and the second set of locations.

10. The computing system of claim 9, wherein the one or more estimated trend coefficients further comprises a first set of variable trend coefficients and a second set of constant trend coefficients.

11. The computing system of claim 9, wherein the hydrometeorological data includes a quantifiable field-based observation.

12. The computing system of claim 9, wherein the hydrometeorological data further includes at least one of a groundwater pressure, a pumping flow-rate, a water level, and a field-based observation.

13. The computing system of claim 12, wherein the executable code is configured to analyze groundwater levels in a geospatial area that is an aquifer.

14. The computing system of claim 13, where the geospatial map is a water level map that estimates an extent of hydraulic containment in the aquifer.

15. The computing system of claim 9, wherein the geospatial area includes a location comprising one or more known coordinates.

16. The computing system of claim 9, wherein the first set of locations and the second set of locations overlap in at least one location.

17. A method for analyzing a groundwater level executable by a computing device configured to process hydrometeorological data, comprising:

receiving a first data set that includes at least one of a groundwater pressure, a pumping flow-rate, and a water level, from a first set of hydrological data-collection stations located at a first set of locations;

receiving a second data set that includes at least one of a groundwater pressure, a pumping flow-rate, and a water level, from a second set of hydrological data-collection stations located at a second set of locations, wherein the second set of locations includes at least one location not included in the first set of locations, and wherein the first data set and the second data set comprise a series of spatio-temporal data sets; and processing the received first data set and the second data set along with a trend associated with a geospatial area including the first set of locations and the second set of locations using a simultaneous multi-event universal kriging method configured to:

estimate one or more trend coefficients based at least in part on the series of spatio-temporal data sets, the trend coefficients for different points in time estimated for all points in time simultaneously;

predict interpolated data points at locations intermediate to data points within the received first data set and the second data set, interpolation weights for all points in time computed by solving a single system of equations based on the spatio-temporal data from all points in time;

produce grids of data suitable for contouring based at least in part on the hydrometeorological data and interpolated data points; and construct a water level map that estimates an extent of hydraulic containment supported by contouring in a capture zone.

* * * * *